(12) United States Patent
Ikeno

(10) Patent No.: US 11,054,704 B2
(45) Date of Patent: Jul. 6, 2021

(54) LIGHT SOURCE DEVICE FOR DISPLAY DEVICE AND LIQUID CRYSTAL DISPLAY DEVICE

(71) Applicant: SHANGHAI TIANMA MICRO-ELECTRONICS CO., LTD., Shanghai (CN)

(72) Inventor: Hidenori Ikeno, Kanagawa (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/081,283

(22) Filed: Oct. 27, 2020

(65) Prior Publication Data
US 2021/0124221 A1 Apr. 29, 2021

(30) Foreign Application Priority Data

Oct. 28, 2019 (JP) ............................. JP2019-194977
Sep. 8, 2020 (JP) ............................. JP2020-150871

(51) Int. Cl.
| | | |
|---|---|---|
| *G02F 1/1343* | (2006.01) | |
| *G02F 1/1368* | (2006.01) | |
| *G02F 1/1362* | (2006.01) | |
| *G02F 1/1347* | (2006.01) | |

(52) U.S. Cl.
CPC ...... *G02F 1/134309* (2013.01); *G02F 1/1347* (2013.01); *G02F 1/136286* (2013.01); *G02F 1/1368* (2013.01); *G02F 2201/123* (2013.01); *G02F 2201/124* (2013.01)

(58) Field of Classification Search
CPC ......... G09G 2320/0646; G09G 3/3406; G09G 3/3648; G09G 3/34; G09G 2300/0434; G02F 1/1335; G02F 1/13471; G02F 1/133601; G02F 1/133606; G02F 1/136286; G02F 1/134363; G02F 1/1362; G02F 1/1336; G02F 1/133607; G02F 1/1343; G02F 1/134309; G02F 1/134345; G02F 1/1368; G02F 2201/124; G02F 2201/121; G02F 2201/122; G02F 2201/123

See application file for complete search history.

(56) References Cited

U.S. PATENT DOCUMENTS

2007/0242186 A1 10/2007 Ikeno et al.
2019/0066609 A1* 2/2019 Hirotsune ............ G09G 3/3648

* cited by examiner

*Primary Examiner* — Thoi V Duong
(74) *Attorney, Agent, or Firm* — Nixon & Vanderhye

(57) ABSTRACT

A light source device for a display device includes a planar light source and a monochrome liquid crystal panel. The monochrome liquid crystal panel includes a plurality of pixel electrodes. Pixel electrodes adjacent to each other in the plurality of pixel electrodes partially overlap each other within one pixel. The monochrome liquid crystal panel includes an exclusive region including a part of one of the plurality of pixel electrodes but not including the other pixel electrodes and an overlap region including parts of pixel electrodes adjacent to each other.

10 Claims, 19 Drawing Sheets

COMPARATIVE EXAMPLE

LIGHT SOURCE DEVICE FOR DISPLAY DEVICE AND LIQUID CRYSTAL DISPLAY DEVICE

CROSS-REFERENCE TO RELATED APPLICATIONS

This non-provisional application claims priority under 35 U.S.C. § 119(a) on Patent Application No. 2019-194977 filed in Japan on Oct. 28, 2019 and Patent Application No. 2020-150871 filed in Japan on Sep. 8, 2020, the entire contents of which are hereby incorporated by reference.

BACKGROUND

This disclosure relates to a light source device for a display device and a liquid crystal display device.

Liquid crystal display devices are applied widely from small-size mobile phones to large-size television monitors because of their characteristics to achieve low power consumption and high resolution. However, the contrast value of a liquid crystal display device placed alone in a dark environment is about 1000 to 2000 at most, which is low compared to the value of an organic light emitting diode (OLED) display device, several millions. This brings a problem that a liquid crystal display device cannot provide sufficient reality in displaying images produced by an imaging source having rich expressions of black, like high dynamic range (HDR) images in recent years.

To solve this problem, the contrast ratio of the liquid crystal display device has to be improved drastically. However, the contrast ratio of a conventional liquid crystal display device is about 2000:1 at most, as described above; the contrast ratio required for HDR images, dozens of thousands to one, cannot be attained.

To address this problem of a liquid crystal display device, stacking a plurality of liquid crystal panels is proposed to raise the contrast ratio by lowering the black level. A contrast higher than the contrast available from a single liquid crystal panel can be attained by stacking a plurality of liquid crystal panels.

A preferable configuration for color display with a liquid crystal display device including stacked liquid crystal panels is disclosed in US 2007/0242186 A. The liquid crystal panel disposed closest to the observer includes color filters and a monochrome liquid crystal panel not including color filters is disposed behind the liquid crystal panel with color filters.

SUMMARY

An aspect of this disclosure is a light source device for a display device. The light source device includes a planar light source and a monochrome liquid crystal panel. The monochrome liquid crystal panel includes a plurality of pixel electrodes. Pixel electrodes adjacent to each other in the plurality of pixel electrodes partially overlap each other within one pixel. The monochrome liquid crystal panel includes an exclusive region including a part of one of the plurality of pixel electrodes but not including the other pixel electrodes and an overlap region including parts of pixel electrodes adjacent to each other.

It is to be understood that both the foregoing general description and the following detailed description are exemplary and explanatory and are not restrictive of this disclosure.

EMBODIMENTS

Hereinafter, embodiments of this disclosure will be described with reference to the accompanying drawings. It should be noted that the embodiments are merely examples to implement the idea of this disclosure and not to limit the technical scope of this disclosure.

Embodiment 1

Configuration of Liquid Crystal Display Device

Figure 1:
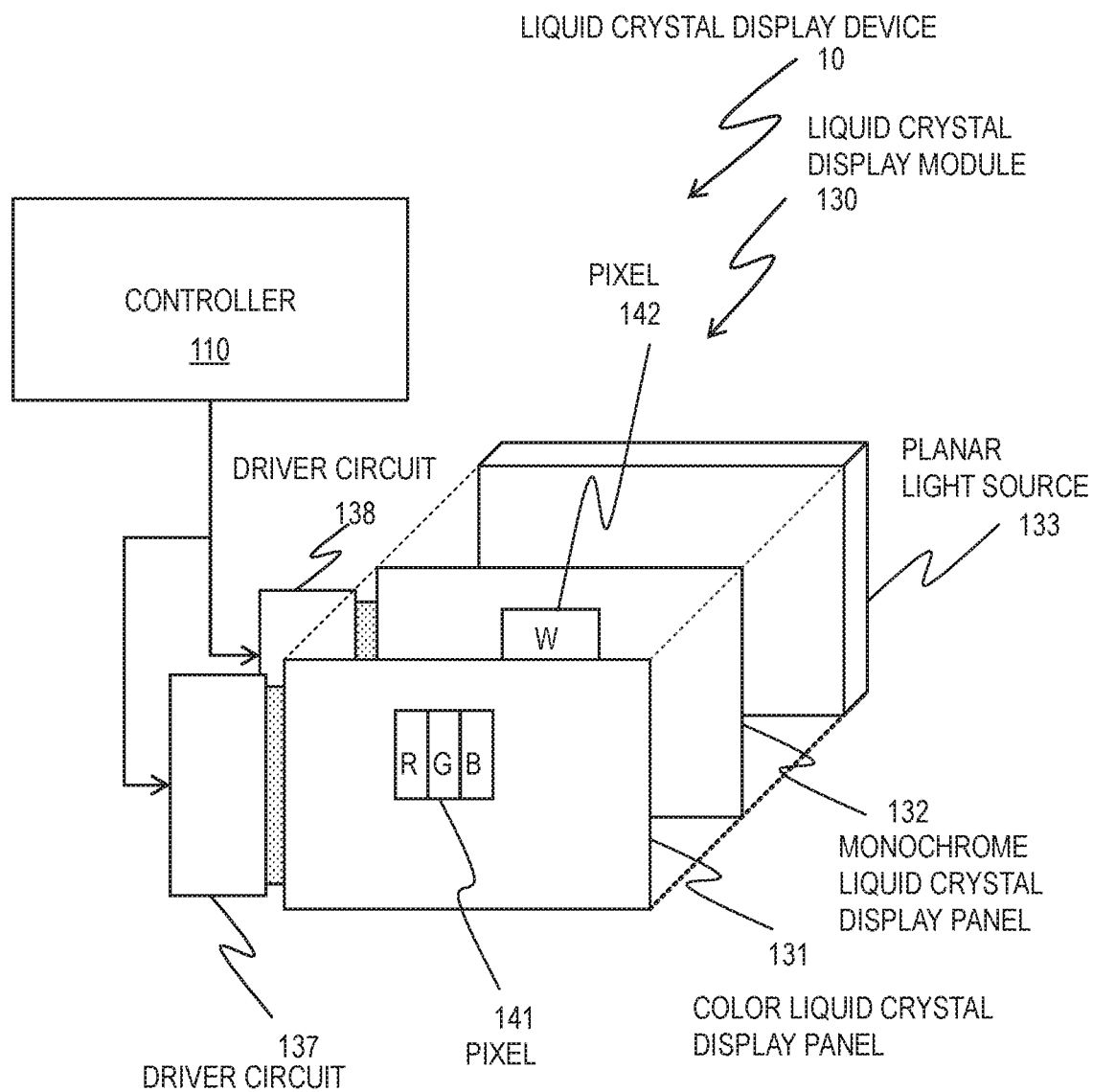
FIG. 1 schematically illustrates a liquid crystal display device in the embodiments of this disclosure.

FIG. 1 schematically illustrates a liquid crystal display device in the embodiments of this disclosure. The liquid crystal display device 10 includes a controller 110 and a liquid crystal display module 130. The liquid crystal display module 130 includes a plurality of stacked liquid crystal panels. The configuration example in FIG. 1 includes two liquid crystal panels 131 and 132.

The controller 110 converts an image signal received from the external to generate signals for the liquid crystal display module 130 to display an image. The controller 110 sends the generated signals to driver circuits 137 and 138 for the liquid crystal panels 131 and 132 of the liquid crystal display module 130.

The liquid crystal display module 130 includes driver circuits 137 and 138, liquid crystal panels 131 and 132, and a planar light source 133. The liquid crystal panel 131 is a color liquid crystal panel for color display. The liquid crystal panel 132 is a monochrome liquid crystal panel for monochrome display. The monochrome liquid crystal panel 132 and the planar light source 133 constitute a light source device.

In the configuration example in FIG. 1, the monochrome liquid crystal panel 132 is provided between the color liquid crystal panel 131 and the planar light source 133. In another configuration example, the color liquid crystal panel 131 is exchanged in location with the monochrome liquid crystal panel 132. That is to say, the monochrome liquid crystal panel 132 is disposed closer to the observer and the color liquid crystal panel 131 is disposed closer to the planar light source 133.

The driver circuits 137 and 138 drive the color liquid crystal panel 131 and the monochrome liquid crystal panel 132, respectively, in accordance with the signals received from the controller 110. The planar light source 133 illuminates the monochrome liquid crystal panel 132 from behind the monochrome liquid crystal panel 132. The monochrome liquid crystal panel 132 controls the amounts of light to be transmitted based on the input driving signal. The light transmitted through the monochrome liquid crystal panel 132 enters the color liquid crystal panel 131. The color liquid crystal panel 131 displays an image based on the input driving signal. The observer views the displayed image produced by the light emitted from the planar light source 133 and transmitted through the liquid crystal panels 132 and 131.

A pixel 141 of the color liquid crystal panel 131 consists of three adjacent subpixels for three colors of red (R), green (G), and blue (B). A pixel 142 of the monochrome liquid crystal panel 132 is not divided into subpixels (one pixel consists of one subpixel). In the example in FIG. 1, the size of the pixels of the color liquid crystal panel 131 is equal to the size of the pixels of the monochrome liquid crystal panel 132; each pixel 141 of the color liquid crystal panel 131 corresponds to a pixel 142 of the monochrome liquid crystal panel 132.

In another example, the size of the pixels of the color liquid crystal panel 131 can be different from the size of the pixels of the monochrome liquid crystal panel 132; the number of pixels of the color liquid crystal panel 131 can be different from the number of pixels of the monochrome liquid crystal panel 132. For example, the color liquid crystal panel 131 can have a larger number of pixels than the monochrome liquid crystal panel 132. In an example, a specific number (for example, 4 or 16) of pixels of the color liquid crystal panel 131 are disposed to be superposed on a pixel of the monochrome liquid crystal panel 132 when viewed planarly.

In one implementation example, the boundaries of the pixels of the monochrome liquid crystal panel 132 coincide with the boundaries of the pixels of the color liquid crystal panel 131 when viewed planarly. In another example, the boundaries of the pixels of the monochrome liquid crystal panel 132 do not have to coincide with the boundaries of the pixels of the color liquid crystal panel 131 when viewed planarly. The number of pixels of the color liquid crystal panel 131 superposed on one pixel of the monochrome liquid crystal panel 132 when viewed planarly can be different among the pixels of the monochrome liquid crystal panel 132.

The above-described configuration example has a color filter layer on only one of the plurality of liquid crystal panels. As a result, significant difference in brightness of the display depending on the angle to see, which is caused by the positional differences among a plurality of color filter layers, is prevented. The liquid crystal display device in this embodiment can include three or more liquid crystal panels and also, two or more color liquid crystal panels.

Configuration of Color Liquid Crystal Panel

Figure 2:
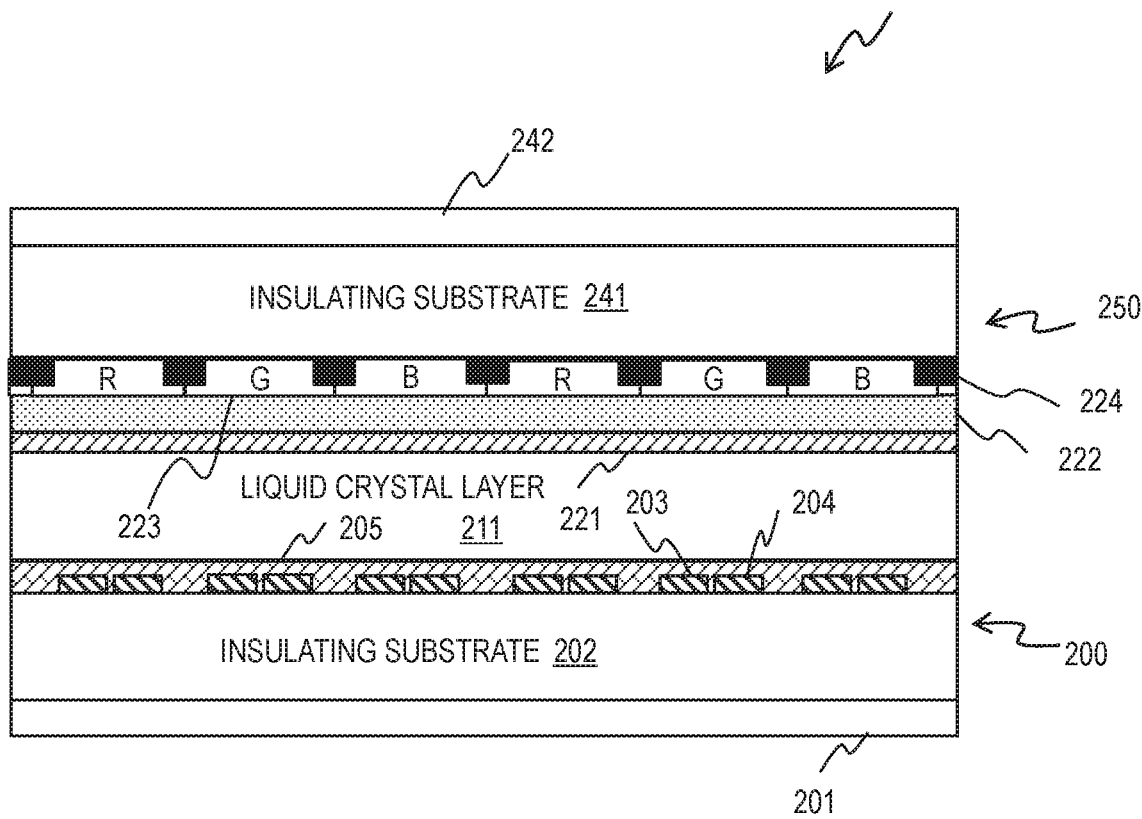
FIG. 2 illustrates an example of the cross-sectional structure of the display region of a color liquid crystal display device.

FIG. 2 illustrates an example of the cross-sectional structure of the display region of the color liquid crystal panel 131. The color liquid crystal panel 131 includes a TFT substrate 200 and an opposite substrate 250 opposed to the TFT substrate 200. A liquid crystal layer 211 is sandwiched between the TFT substrate 200 and the opposite substrate 250. The TFT substrate 200 includes an insulating substrate 202. The insulating substrate 202 is an insulative transparent substrate made of glass or resin. An example of the insulating substrate 202 has a rectangular shape and one of the main faces is opposed to one of the main faces of the opposite substrate 250. A polarizing plate 201 is attached on the other main face of the insulating substrate 202 on the opposite side of the liquid crystal layer 211.

Pixel electrodes 203 and common electrodes (also called opposite electrodes) 204 for applying electric fields to the liquid crystal layer 211 are arrayed on the main face of the insulating substrate 202 facing the liquid crystal layer 211. Each pair of a pixel electrode 203 and a common electrode 204 applies an electric field to the liquid crystal in one subpixel. The amount of light transmitted through a subpixel depends on the applied electric field. A not-shown thin film transistor (TFT) array for selecting a subpixel to be controlled is fabricated on the insulating substrate 202.

The configuration example illustrated in FIG. 2 is a horizontal electric field control type of liquid crystal panel. Examples of the horizontal electric field control type of liquid crystal panels include in-plane switching (IPS) type and fringe field switching (FFS) type of liquid crystal panels. In FIG. 2, only the pixel electrode and the common electrode for one of the plurality of subpixels are provided with reference signs 203 and 204, respectively.

An alignment film 205 is laid to cover the electrode layer including the pixel electrodes 203 and the common electrodes 204. The alignment film 205 is in contact with the liquid crystal layer 211 to define the orientation (initial alignment) of liquid crystal molecules when no electric field is applied.

In the configuration example in FIG. 2, the opposite substrate 250 is a color filter (CF) substrate including color filters. The opposite substrate 250 includes an insulating substrate 241 made of glass or resin. The insulating substrate 241 can have a rectangular shape. A polarizing plate 242 is attached on the main face of the insulating substrate 241 on the opposite side of the liquid crystal layer 211.

A grid-like black matrix 224 for defining pixels is laid on the main face of the insulating substrate 241 on the side of the liquid crystal layer 211. Each region corresponding to a subpixel surrounded by the black matrix 224 is provided with a color filter 223 for red, green, or blue.

An insulative overcoat layer 222 is laid on the color filters 223. The overcoat layer 222 is optional. An alignment film 221 is laid on the overcoat layer 222. The alignment film 221 is in contact with the liquid crystal layer 211 and defines the orientation (initial alignment) of the liquid crystal molecules when no electric field is applied.

Either the TFT substrate 200 or the opposite substrate 250 is located on the front to face the observer and the other substrate is located on the back. Accordingly, the planar light source 133 is disposed under the TFT substrate 200 or above the opposite substrate 250 of the liquid crystal panel illustrated in FIG. 2.

The liquid crystal layer 211 controls the amount of light to be transmitted through each subpixel in accordance with the electric field between a pixel electrode 203 and a common electrode 204. The driver circuit 137 selects each subpixel with the associated TFT and controls the potentials of the pixel electrode 203 and the common electrode 204 for the subpixel. The driver circuit 137 controls the potentials of the pixel electrode 203 and the common electrode 204 of each subpixel in accordance with image data to control the amount of light to be transmitted through the subpixel.

The monochrome liquid crystal panel 132 has a configuration such that the color filters 223 and the black matrix 224 are removed from the configuration example of the color liquid crystal panel 131 illustrated in FIG. 2. Because of no black matrix, the monochrome liquid crystal panel 132 has a higher aperture ratio. Further, the TFT substrate of the monochrome liquid crystal panel 132 has a configuration different from the TFT substrate 200 of the color liquid crystal panel 131 as will be described later.

For the color liquid crystal panel 131 and the monochrome liquid crystal panel 132, vertical electric field control type of liquid crystal panels such as twisted nematic (TN) type or vertical alignment (VA) type of liquid crystal panels can be employed, instead of the horizontal electric field control type of liquid crystal panel as illustrated in FIG. 2 and described in the following. The monochrome liquid crystal panel 132 can include a black matrix surrounding pixels (along pixel boundaries).

Comparative Example of Monochrome Liquid Crystal Panel

Figure 3:
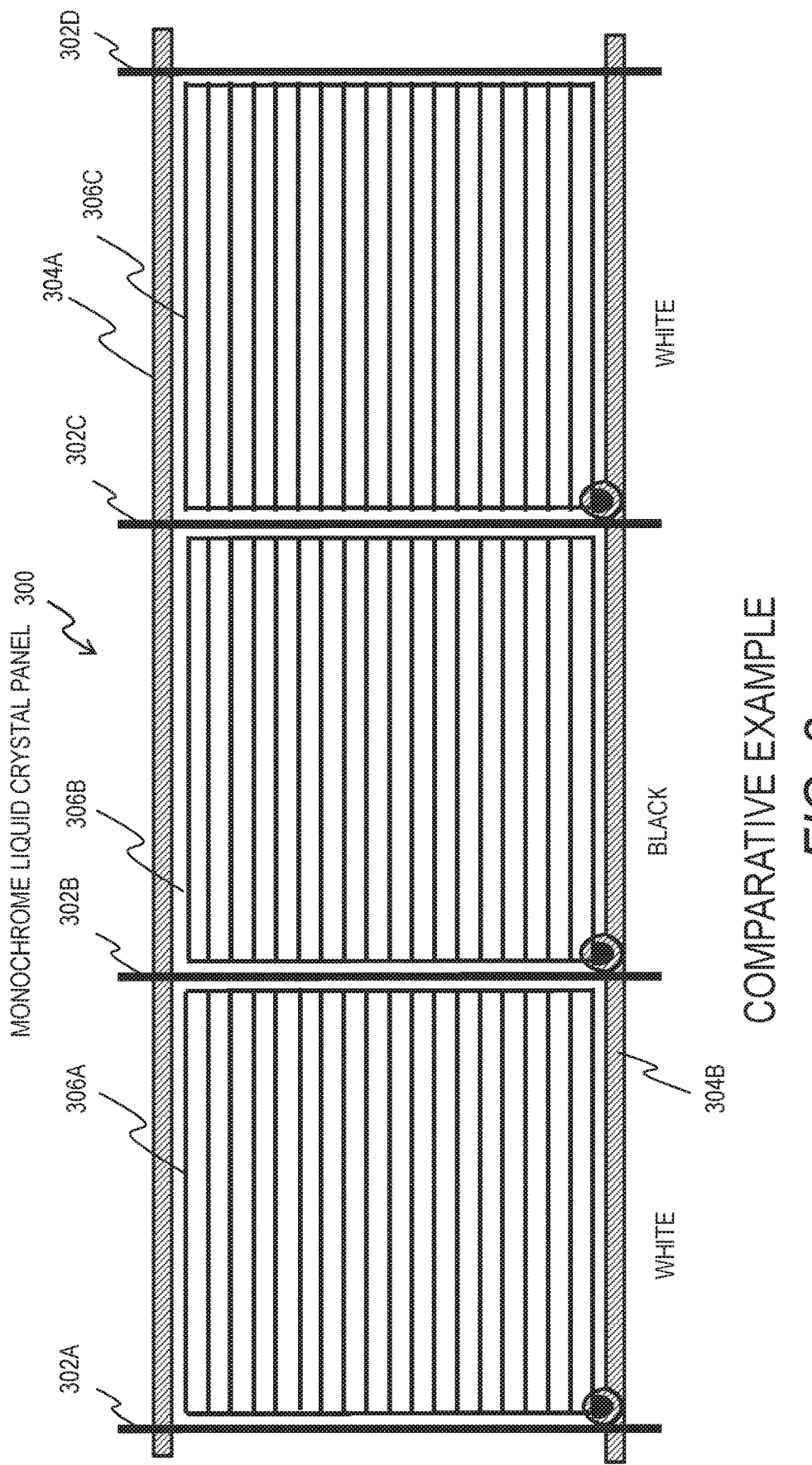
FIG. 3 is a plan diagram schematically illustrating a comparative configuration example of the TFT substrate of a monochrome liquid crystal panel.

FIG. 3 is a plan diagram schematically illustrating a comparative configuration example of the TFT substrate of a monochrome liquid crystal panel. FIG. 3 includes four consecutive data lines 302A to 302D, two consecutive gate lines 304A and 304B, and three consecutive pixel electrodes 306A, 306B, and 306C in a monochrome liquid crystal panel 300 in the comparative configuration example.

The pixel electrode 306A is surrounded by the gate lines 304A and 304B and the data lines 302A and 302B. The data line 302A supplies a data signal to the pixel electrode 306A through the TFT controlled by the gate line 304B. The pixel electrode 306B is surrounded by the gate lines 304A and 304B and the data lines 302B and 302C. The data line 302B supplies a data signal to the pixel electrode 306B through the TFT controlled by the gate line 304B. The pixel electrode 306C is surrounded by the gate lines 304A and 304B and the data lines 302C and 302D. The data line 302C supplies a data signal to the pixel electrode 306C through the TFT controlled by the gate line 304B.

Each of the pixel electrodes 306A, 306B, and 306C generates an electric field with a not-shown common electrode to control the amount (brightness) of light to be transmitted through the corresponding pixel region.

In the example in FIG. 3, the region surrounded by two adjacent data lines and two adjacent gate lines (including parts of the data lines and gate lines) can be a pixel region. In the example in FIG. 3, the pixel electrodes 306A, 306B, and 306C have a shape of a horizontal lattice and includes a rectangular frame and a plurality of strips disposed to be distant from one another within the frame. The strips extend along a gate line and are disposed to be distant from one another along a data line. The both ends of each strip are connected with the frame.

The comparative configuration example in FIG. 3 controls the pixel electrodes 306A, 306B, and 306C independently to control the amounts (brightness) of light to be transmitted through their associated pixels. The pixel electrodes 306A, 306B, and 306C are distant from one another and the amount of light to be transmitted through each pixel depends on only the signal potential of the associated pixel electrode. For example, the pixel of the pixel electrode 306A displays white, the pixel of the pixel electrode 306B displays black, and the pixel of the pixel electrode 306C displays white independently, as illustrated in FIG. 3.

The above-described configuration in which adjacent pixel electrodes independently control brightness of the associated pixels enables display with a high contrast ratio between adjacent pixels. However, in the case of displaying an image with a plurality of stacked liquid crystal panels, a configuration to attain a high contrast ratio (high spatial frequency) between adjacent pixel electrodes like this example makes the observer's eyes focus on the monochrome liquid crystal panel, so that the observer may see double images.

For this reason, it is important to grade the image on the monochrome liquid crystal panel by diffusion process. For the diffusion process, the monochrome liquid crystal panel has to have high resolution. Raising the resolution increases the number of data lines and reduces the transmittance (aperture ratio). The transmittance of a liquid crystal display device including a plurality of stacked liquid crystal panels is the product of transmittances of the plurality of liquid crystal panels. Accordingly, if the transmittance of each liquid crystal panel is low, the transmittance of the whole liquid crystal display device becomes very low.

Layout of Pixel Electrodes in Monochrome Liquid Crystal Panel

Figure 4A:
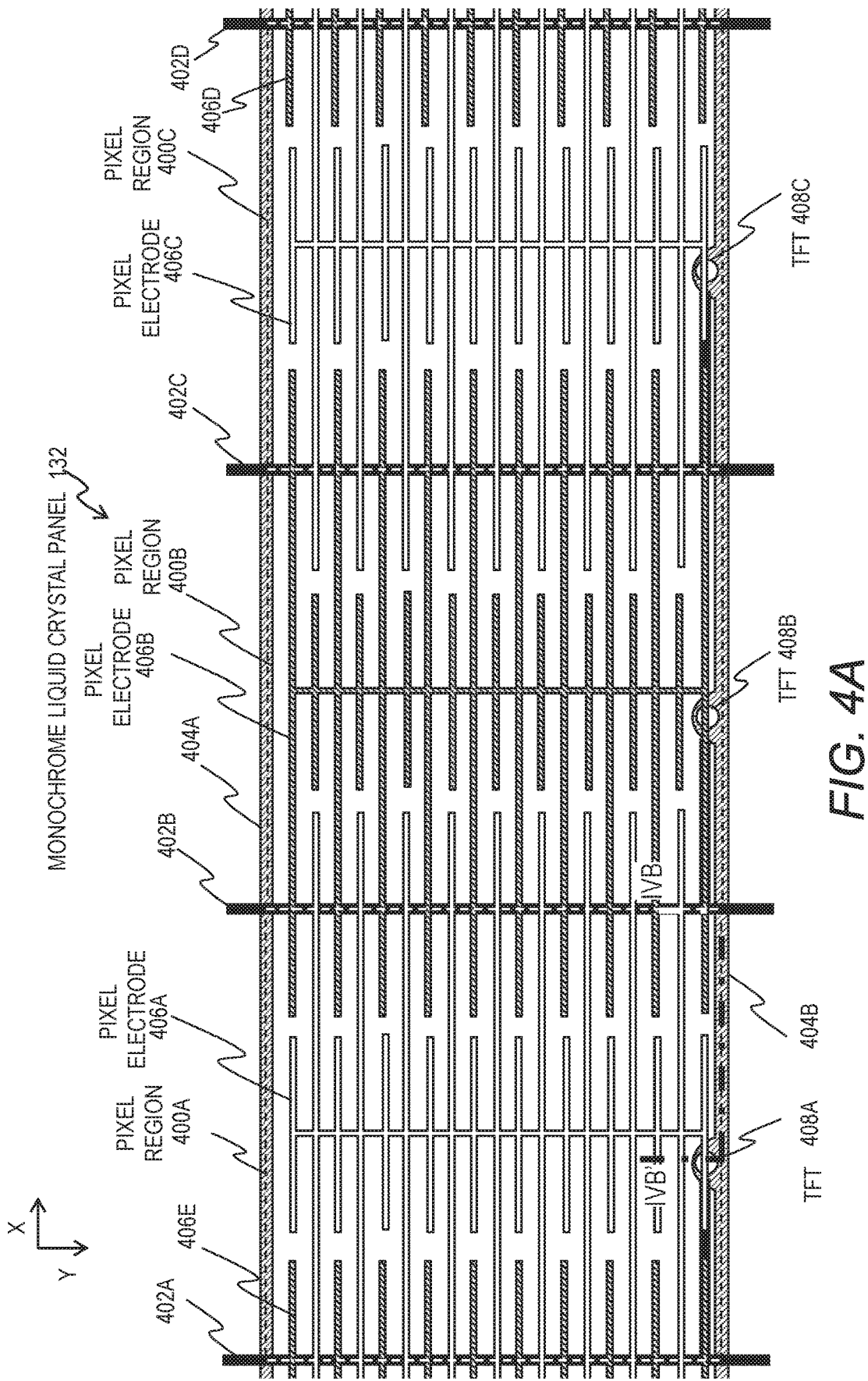
FIG. 4A is a plan diagram schematically illustrating a configuration example of the TFT substrate of a monochrome liquid crystal panel in Embodiment 1.

FIG. 4A is a plan diagram schematically illustrating a configuration example of the TFT substrate of a monochrome liquid crystal panel 132 in this embodiment. The configuration example described in the following is an FFS type of liquid crystal panel. FIG. 4A illustrates a configuration of a part of the display region. Specifically, FIG. 4A illustrates four consecutive data lines 402A to 402D, two consecutive gate lines 404A and 404B, and five consecutive pixel electrodes 406A to 406E, and the TFTs 408A, 408B, and 408C associated with the pixel electrodes 406A, 406B, and 406C, respectively. The monochrome liquid crystal panel 132 further includes a not-shown common electrode for generating electric fields with the pixel electrodes 406A, 406B, and 406C.

The monochrome liquid crystal panel 132 includes a plurality of data lines including the data lines 402A to 402D; the data lines extend along the Y-axis in FIG. 4A (an example of the first axis or the second axis) and are disposed to be distant from one another along the X-axis (an example of the second axis or the first axis) that is perpendicular to the Y-axis. The monochrome liquid crystal panel 132 includes a plurality of gate lines including the gate lines 404A and 404B; the gate lines extend along the X-axis and are disposed to be distant from one another along the Y-axis.

The pixel electrodes 406A to 406E are consecutive pixel electrodes included in one pixel electrode row composed of a plurality of pixel electrodes disposed side by side along the X-axis. The monochrome liquid crystal panel 132 includes a plurality of pixel electrode rows disposed one above another along the Y-axis. Each of the pixel electrodes 406A to 406E has a shape like a comb with teeth on both sides. The pixel electrodes 406A and 406C have identical shapes.

The pixel electrodes 406B, 406D, and 406E have identical shapes. The shape of the pixel electrodes 406A and 406C is different from the shape of the pixel electrodes 406B, 406D, and 406E. Two kinds of pixel electrodes having different shapes are disposed alternately along the X-axis. The details of the shapes of the pixel electrodes will be described later.

In the configuration example in FIG. 4A, the pixel electrode 406A is disposed between the gate lines 404A and 404B. A part of the pixel electrode 406A including its central part is located between the data lines 402A and 402B. Other parts of the pixel electrode 406A are located between the data line 402A and the data line adjacent to the data line 402A on the opposite side of the data line 402B. The remaining parts of the pixel electrode 406A are located between the data lines 402B and 402C.

The pixel electrode 406B is disposed between the gate lines 404A and 404B. A part of the pixel electrode 406B including its central part is located between the data lines 402B and 402C. Other parts of the pixel electrode 406B are located between the data lines 402A and 402B. The remaining parts of the pixel electrode 406B are located between the data lines 402C and 402D.

The pixel electrode 406C is disposed between the gate lines 404A and 404B. A part of the pixel electrode 406C including its central part is located between the data lines 402C and 402D. Other parts of the pixel electrode 406C are located between the data lines 402B and 402C. The remaining parts of the pixel electrode 406C are located between the data line 402D and the data line adjacent to the data line 402D on the opposite side of the data line 402C.

The data line 402A supplies a data signal to the pixel electrode 406A through the TFT 408A controlled by the gate line 404B. The data line 402B supplies a data signal to the pixel electrode 406B through the TFT 408B controlled by the gate line 404B. The data line 402C supplies a data signal to the pixel electrode 406C through the TFT 408C controlled by the gate line 404B.

Each TFT in FIG. 4A is for one pixel electrode. However, one TFT may not be enough to supply sufficient signal voltage to a pixel electrode within a predetermined period. In that case, increasing the number of TFTs (for example, into two) to increase the signal voltage supply paths solves the problem. The same applies to the embodiments to be described later.

In FIG. 4A, the pixel regions 400A, 400B, and 400C are surrounded by a broken line. The pixel region 400A associated with the pixel electrode 406A includes a region surrounded by the gate lines 404A and 404B and the data lines 402A and 402B. The pixel region 400A further includes parts of the gate lines and the data lines. The pixel region 400A includes a part of the pixel electrode 406A including its central part and further, parts of the pixel electrodes 406E and 406B adjacent to the pixel electrode 406A on both sides.

The pixel region 400B associated with the pixel electrode 406B includes a region surrounded by the gate lines 404A and 404B and the data lines 402B and 402C. The pixel region 400B further includes parts of the gate lines and the data lines. The pixel region 400B includes a part of the pixel electrode 406B including its central part and further, parts of the pixel electrodes 406A and 406C adjacent to the pixel electrode 406B on both sides.

The pixel region 400C associated with the pixel electrode 406C includes a region surrounded by the gate lines 404A and 404B and the data lines 402C and 402D. The pixel region 400C further includes parts of the gate lines and the data lines. The pixel region 400C includes a part of the pixel electrode 406C including its central part and further, parts of the pixel electrodes 406B and 406D adjacent to the pixel electrode 406C on both sides.

As illustrated in FIG. 4A, each pixel electrode overlaps the pixel electrodes adjacent thereto along the X-axis. For example, the pixel electrode 406B overlaps the pixel electrodes 406A and 406C adjacent thereto on both sides and the pixel electrode 406C overlaps the pixel electrodes 406B and 406D adjacent thereto on both sides.

A pixel region includes the central part of the associated pixel electrode and parts of pixel electrodes adjacent to the associated pixel electrode. In other words, parts of the adjacent pixel electrodes extend into the pixel region. For example, the pixel region 400B includes a part of the electrode 406B and parts of its adjacent pixel electrodes 406A and 406C on both sides. The pixel region 400C includes a part of the electrode 406C and parts of its adjacent pixel electrodes 406B and 406D on both sides.

Figure 4B:
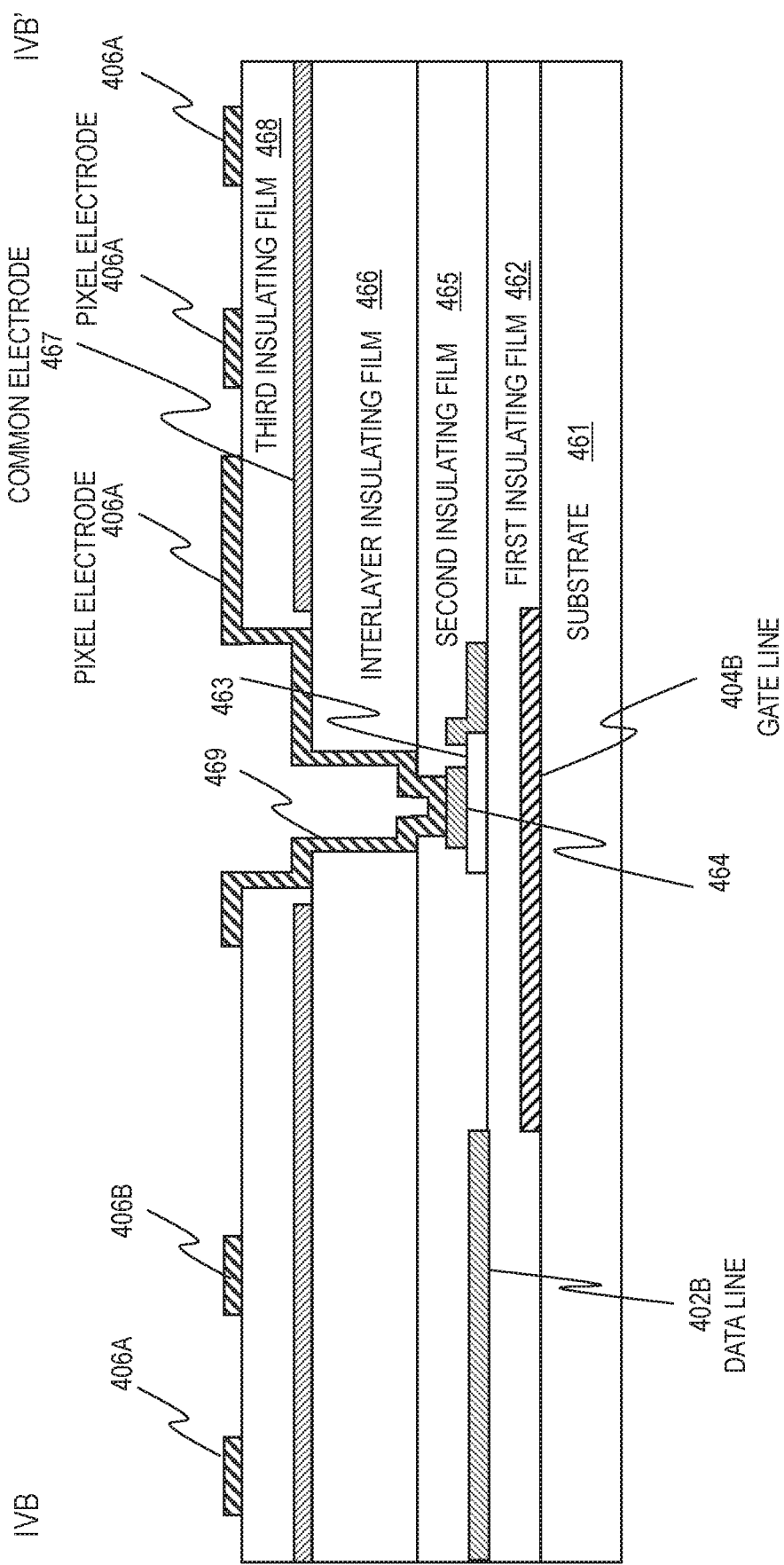
FIG. 4B is a cross-sectional diagram along the section line IVB-IVB' in FIG. 4A.

FIG. 4B is a cross-sectional diagram along the section line IVB-IVB' in FIG. 4A. The liquid crystal panel in this configuration example is of an FFS type. The TFT substrate of the monochrome liquid crystal panel 132 includes an insulating substrate 461. The insulating substrate 461 is an insulative transparent substrate made of glass or resin. A polarizing plate is omitted in FIG. 4B. The gate line 404B is provided on the main face of the insulating substrate 461 facing the liquid crystal layer (not shown in FIG. 4B). The gate line 404B has a single-layer or multi-layer structure using a metal such as Al, Mo, or Cr or an alloy thereof.

A first insulating film (gate insulating film) 462 is provided to cover the gate line 404B. The first insulating film can be a silicon nitride film or silicon oxide film. A semiconductor film 463 included in the TFT 408A is provided on the first insulating film 462 to overlap the gate line 404B when viewed planarly. Further, the data line 402B is provided on the first insulating film 462 to be in contact with the semiconductor film 463. An interconnector 464 included in the same metal layer as the data line 402B is provided above and in contact with the semiconductor film 463 to be distant from the data line 402B.

A second insulating film 465 and an interlayer insulating film 466 are provided to cover the data line 402B. The second insulating film 465 can be a silicon nitride film or a silicon oxide film; the interlayer insulating film 466 can be an organic film like a polyimide film. The interlayer insulating film 466 is optional.

A common electrode 467 is provided on the interlayer insulating film 466. The common electrode 467 can be made of indium tin oxide (ITO). A third insulating film 468 is provided to cover the common electrode 467. The third insulating film 468 can be a silicon nitride film or a silicon oxide film.

A via hole is opened through the third insulating film 468, the second insulating film 465, and the interlayer insulating film 466 to expose the interconnector 464. A via 469 continued from a pixel electrode 406A is in contact with the interconnector 464 in the via hole. The via 469 and the pixel electrode 406B are included in the same metal layer as the pixel electrode 406A. This metal layer is made of ITO, for example.

The pixel electrodes 406A and 406B in FIGS. 4A and 4B are fabricated with the same metal layer. However, if a foreign particle is attached to a gap between a tooth of the pixel electrode 406A and a tooth of the pixel electrode 406B in the overlap region in some manufacturing step, for example, the electrodes could become short-circuited to cause a display defect. For this reason, the pixel electrodes 406A and 406B can be fabricated on different layers to prevent the short-circuit.

Figure 5:
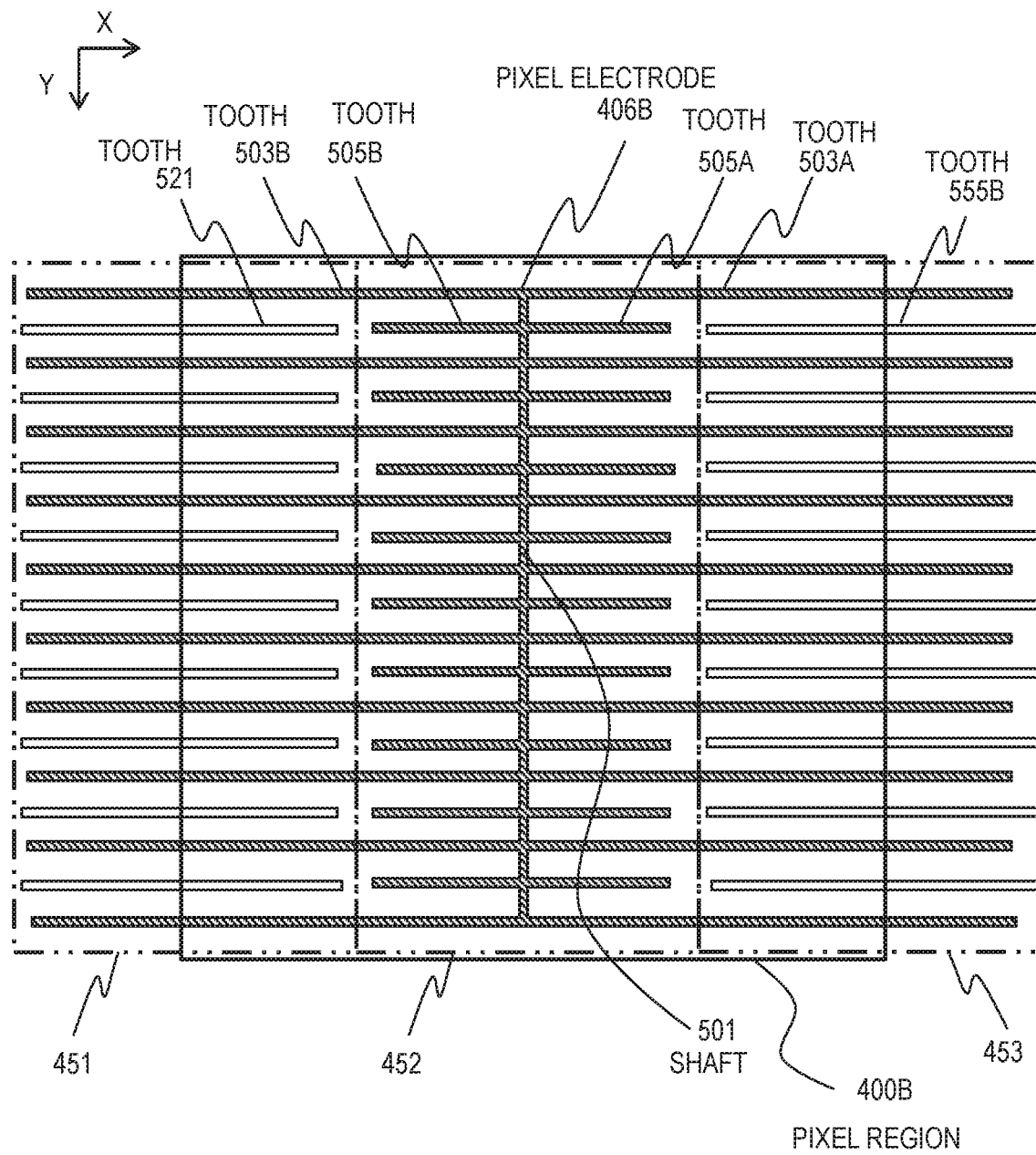
FIG. 5 illustrates a structure of a pixel electrode and a positional relation of the pixel electrode with its adjacent pixel electrodes.

FIG. 5 illustrates the structure of the pixel electrode 406B and the positional relation of the pixel electrode 406B with its adjacent pixel electrodes 406A and 406C. The pixel electrode 406B has a shape like a comb with tooth on both sides; it has a central shaft 501 extending along the Y-axis and a plurality of teeth extending from the shaft 501 along the X-axis on both sides. The pixel electrode 406B has a row of teeth on either side of the shaft 501 and the row of teeth is composed of a plurality of teeth disposed at predetermined intervals along the Y-axis. Each row of teeth is composed of two kinds of teeth having different lengths disposed alternately.

In FIG. 5, two teeth extending rightward from the shaft 501 are provided with reference signs 503A and 505A and two teeth extending leftward from the shaft 501 are provided with reference signs 503B and 505B, by way of example. The teeth 503A and 503B are long teeth and the teeth 505A and 505B are short teeth. The length of the short teeth can be approximately a half of the length of the long teeth.

The teeth 503A and 503B are located at the same position with respect to the Y-axis and have the same length. The teeth 505A and 505B are located at the same position with respect to the Y-axis and have the same length. The teeth 503A and 503B are located at one end of each row of teeth. The teeth 505A and 505B are adjacent to the teeth 503A and 503B, respectively. In each row of teeth, long teeth are provided at both ends.

Although the configuration example illustrated in FIG. 5 have the long teeth at the same positions with respect to the Y-axis on both sides of the shaft 501, they can be located at different positions. In similar, the short teeth are located at the same positions with respect to the Y-axis on both sides, but they can be located at different positions. The number of teeth in each row can be the same or different. A row can include one kind of length or three or more kinds of lengths of teeth; the kinds of the length included in a row of teeth can be different between the rows on both sides. Although the teeth in the example in FIG. 5 have the same width (dimension along the Y-axis), the teeth can have different widths.

As illustrated in FIG. 5, the pixel region 400B includes parts of two overlap regions 451 and 453 and an exclusive region 452 sandwiched by the overlap regions 451 and 453. The overlap region 451, the exclusive region 452, and the overlap region 453 are disposed side by side along the X-axis.

The exclusive region 452 includes only the pixel electrode 406B (a part thereof) and does not include other pixel electrodes. Specifically, the exclusive region 452 includes the shaft 501 and parts of the teeth on both sides thereof of the pixel electrode 406B. More specifically, the exclusive region 452 includes the entireties of all short teeth and parts closer to the shaft 501 of all long teeth.

The pixel electrodes 406A and 406B adjacent to each other overlap each other in the overlap region 451. A part of the overlap region 451 is included in the pixel region 400B and the remaining of the overlap region 451 is included in the pixel region 400A. In the overlap region 451, a row of long teeth of the pixel electrode 406A overlap a row of long teeth of the pixel electrode 406B. In FIG. 5, one of the long teeth of the pixel electrode 406A is provided with a reference sign 521, by way of example.

In the overlap region 451, the pixel electrodes 406A and 406B are disposed so that the long teeth of the pixel electrode 406A engage the long teeth of the pixel electrode 406B. Each long tooth of the pixel electrode 406A extends into the gap between long teeth of the pixel electrode 406B. Each long tooth of the pixel electrode 406B, except for the teeth on both ends, extends into the gap between long teeth of the pixel electrode 406A. In the overlap region 451, long teeth of the pixel electrode 406B are located alternately with long teeth of the pixel electrode 406A along the Y-axis.

A part including the tip of a long tooth of the pixel electrode 406A is located between adjacent long teeth of the pixel electrode 406B. Between the adjacent long teeth of the pixel electrode 406B, a short tooth of the pixel electrode 406B is also located. In the example of FIG. 5, the short tooth of the pixel electrode 406B and the long tooth of the pixel electrode 406A are located at the same position with respect to the Y-axis and their tips are opposed to each other. The short tooth of the pixel electrode 406B and the long tooth of the pixel electrode 406A can be located at different positions with respect to the Y-axis.

The pixel electrodes 406B and 406C adjacent to each other overlap each other in the overlap region 453. A part of the overlap region 453 is included in the pixel region 400B and the remaining of the overlap region 453 is included in the pixel region 400C. In the overlap region 453, a row of long teeth of the pixel electrode 406B overlap a row of long teeth of the pixel electrode 406C. In FIG. 5, one of the long teeth of the pixel electrode 406C is provided with a reference sign 555B, by way of example.

In the overlap region 453, the pixel electrodes 406B and 406C are disposed so that the long teeth of the pixel electrode 406B engage the long teeth of the pixel electrode 406C. Each long tooth of the pixel electrode 406C extends into the gap between long teeth of the pixel electrode 406B. Each long tooth of the pixel electrode 406B, except for the teeth on both ends, extends into the gap between long teeth of the pixel electrode 406C. In the overlap region 453, long teeth of the pixel electrode 406B are located alternately with long teeth of the pixel electrode 406C along the Y-axis.

A part including the tip of a long tooth of the pixel electrode 406C is located between adjacent long teeth of the pixel electrode 406B. A short tooth of the pixel electrode 406B is also located between the adjacent long teeth of the pixel electrode 406B. In the example of FIG. 5, the short tooth of the pixel electrode 406B and the long tooth of the pixel electrode 406C are located at the same position with respect to the Y-axis and their tips are opposed to each other. The short tooth of the pixel electrode 406B and the long tooth of the pixel electrode 406C can be located at different positions with respect to the Y-axis.

In the configuration example in FIG. 5, the total area sizes of the teeth-like electrodes are substantially equal among the overlap regions 451, 453 and the exclusive region 452. In the configuration example in FIG. 5, the sum of the number of pairs of short teeth located at the same position with respect to the Y-axis and the number of pairs of long teeth located at the same position with respect to the Y-axis of the pixel electrode 406B in the exclusive region 452 is equal to the sum of the number of long teeth of the pixel electrode 406A and the number of long teeth of the pixel electrode 406B in the overlap region 451. In similar, the sum of the number of short teeth pairs and the number of long teeth pairs in the exclusive region 452 is equal to the sum of the number of long teeth of the pixel electrode 406B and the number of long teeth of the pixel electrode 406C in the overlap region 453.

In each of the overlap regions 451 and 453 in the configuration example in FIG. 5, the area sizes of two pixel electrodes are different. Specifically, the area of the pixel electrode 406B (the total area of its teeth) is larger than the area of the pixel electrode 406A (the total area of its teeth) in the overlap region 451; the area of the pixel electrode 406B is larger than the area of the pixel electrode 406C in the overlap region 453. In another example, the areas of two pixel electrodes in an overlap region can be equal.

Figure 6:
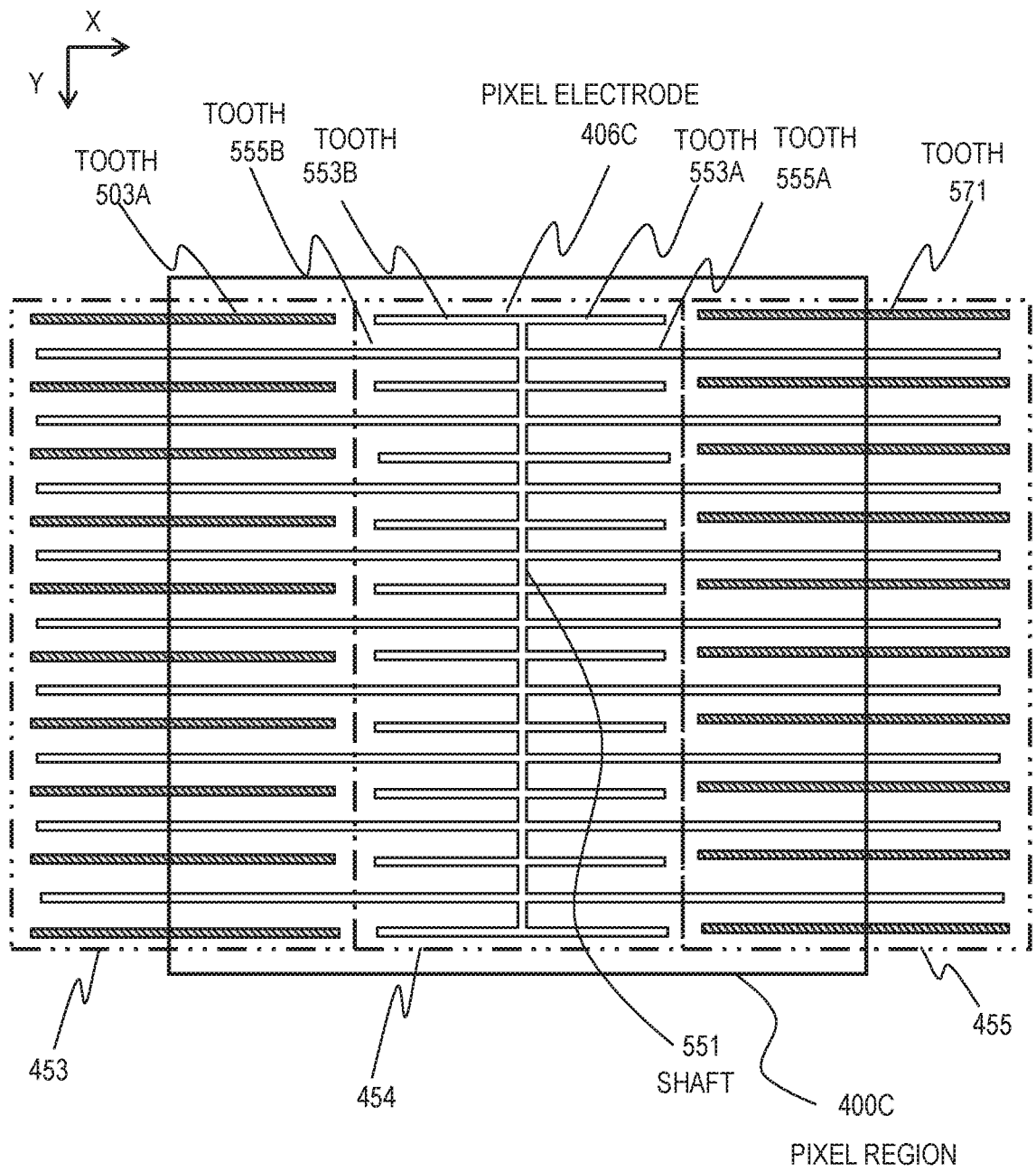
FIG. 6 illustrates a structure of another pixel electrode and a positional relation of the pixel electrode with its adjacent pixel electrodes.

FIG. 6 illustrates the structure of the pixel electrode 406C and the positional relation of the pixel electrode 406C with its adjacent pixel electrodes 406B and 406D. The pixel electrode 406C has a shape like a comb with tooth on both sides; it has a central shaft 551 extending along the Y-axis and a plurality of teeth extending from the shaft 551 along the X-axis on both sides. The pixel electrode 406C has a row of teeth on either side of the shaft 551 and the row of teeth is composed of a plurality of teeth disposed at predetermined intervals along the Y-axis. Each row of teeth is composed of two kinds of teeth having different lengths disposed alternately.

In FIG. 6, two teeth extending rightward from the shaft 551 are provided with reference signs 553A and 555A and two teeth extending leftward from the shaft 551 are provided with reference signs 553B and 555B, by way of example. The teeth 553A and 553B are short teeth and the teeth 555A and 555B are long teeth. The length of the short teeth can be approximately a half of the length of the long teeth.

The teeth 553A and 553B are located at the same position with respect to the Y-axis and have the same length. The teeth 555A and 555B are located at the same position with respect to the Y-axis and have the same length. The teeth 553A and 553B are located at one end of each row of teeth. The teeth 555A and 555B are adjacent to the teeth 553A and 553B, respectively. In each row of teeth, short teeth are provided at both ends.

Although the configuration example illustrated in FIG. 6 have the short teeth at the same positions with respect to the Y-axis on both sides of the shaft 551, they can be located at different positions. In similar, the long teeth are located at the same positions with respect to the Y-axis on both sides, but they can be located at different positions. The number of teeth in each row can be the same or different. A row can include one kind of length or three or more kinds of lengths of teeth; the kinds of the length included in a row of teeth can be different between the rows on both sides. Although the teeth in the example in FIG. 6 have the same width (dimension along the Y-axis), the teeth can have different widths.

As illustrated in FIG. 6, the pixel region 400C includes parts of two overlap regions 453 and 455 and an exclusive region 454 sandwiched by the overlap regions 453 and 455. The overlap region 453, the exclusive region 454, and the overlap region 455 are disposed side by side along the X-axis.

The exclusive region 454 includes only the pixel electrode 406C (a part thereof) and does not include any other pixel electrodes. Specifically, the exclusive region 454 includes the shaft 551 and parts of the teeth on both sides thereof of the pixel electrode 406C. More specifically, the exclusive region 454 includes the entireties of all short teeth and parts closer to the shaft 551 of all long teeth.

As described above, the pixel electrodes 406C and 406B adjacent to each other overlap each other in the overlap region 453. A part including the tip of a long tooth of the pixel electrode 406B is located between adjacent long teeth of the pixel electrode 406C. Between the adjacent long teeth of the pixel electrode 406C, a short tooth of the pixel electrode 406C is also located. In the example of FIG. 6, the short tooth of the pixel electrode 406C and the long tooth of the pixel electrode 406B are located at the same position with respect to the Y-axis and their tips are opposed to each other. The short tooth of the pixel electrode 406C and the long tooth of the pixel electrode 406B can be located at different positions with respect to the Y-axis.

The pixel electrodes 406C and 406D adjacent to each other overlap each other in the overlap region 455. A part of the overlap region 455 is included in the pixel region 400C and the remaining of the overlap region 455 is included in the pixel region 400D. In the overlap region 455, a row of long teeth of the pixel electrode 406C overlap a row of long teeth of the pixel electrode 406D. In FIG. 6, one of the long teeth of the pixel electrode 406D is provided with a reference sign 571, by way of example.

In the overlap region 455, the pixel electrodes 406C and 406D are disposed so that the long teeth of the pixel electrode 406C engage the long teeth of the pixel electrode 406D. Each long tooth of the pixel electrode 406C extends into the gap between long teeth of the pixel electrode 406D. Each long tooth of the pixel electrode 406D, except for the teeth on both ends, extends into the gap between long teeth of the pixel electrode 406C. In the overlap region 455, long teeth of the pixel electrode 406C are located alternately with long teeth of the pixel electrode 406D along the Y-axis.

A part including the tip of a long tooth of the pixel electrode 406D is located between adjacent long teeth of the pixel electrode 406C. A short tooth of the pixel electrode 406C is also located between the adjacent long teeth of the pixel electrode 406C. In the example of FIG. 6, the short tooth of the pixel electrode 406C and the long tooth of the pixel electrode 406D are located at the same position with respect to the Y-axis and their tips are opposed to each other. The short tooth of the pixel electrode 406C and the long tooth of the pixel electrode 406D can be located at different positions with respect to the Y-axis.

In the configuration example in FIG. 6, the total area sizes of the teeth-like electrodes are substantially equal among the overlap regions 453, 455 and the exclusive region 454. In the configuration example in FIG. 6, the sum of the number of pairs of short teeth located at the same positions with respect to the Y-axis and the number of pairs of long teeth located at the same position with respect to the Y-axis of the pixel electrode 406C in the exclusive region 454 is equal to the sum of the number of long teeth of the pixel electrode 406B and the number of long teeth of the pixel electrode 406C in the overlap region 453. In similar, the sum of the number of short teeth pairs and the number of long teeth pairs in the exclusive region 454 is equal to the sum of the number of long teeth of the pixel electrode 406C and the number of long teeth of the pixel electrode 406D in the overlap region 455.

In the overlap region 455 in the configuration example in FIG. 6, the total area sizes of the two pixel electrodes are different. Specifically, the area of the pixel electrode 406C (the total area of its teeth) is smaller than the area of the pixel electrode 406D (the total area of its teeth) in the overlap region 455. In another example, the areas of two pixel electrodes in an overlap region can be equal.

As described above, pixel electrodes adjacent to each other in a pixel electrode row extending along a gate line partially overlap each other. In the pixel electrode row, overlap regions and exclusive regions are disposed alternately. A part of an overlap region is included in one of two adjacent pixel regions and the remaining part is included in the other one of the two adjacent pixel regions. An exclusive region is included in one pixel region.

As described above, an overlap region includes two adjacent pixel electrodes (parts thereof). The driver circuit 138 supplies a pixel electrode row extending along the X-axis with signal potentials having the same polarity with respect to the common potential and its adjacent pixel rows with signal potentials having the same or opposite polarity with respect to the common potential. Since the two pixel electrodes in an overlap region are supplied with signal potentials of the same polarity, the liquid crystal in the overlap region is supplied with a signal potential intermediate between the signal potentials in the exclusive regions of the two pixel electrodes. That is to say, the gray level of the overlap region between the exclusive regions is a level intermediate between the gray levels of the two exclusive regions. The driver circuit 138 alternates the polarities of the signal potential to be supplied to each electrode frame by frame.

Figure 7:
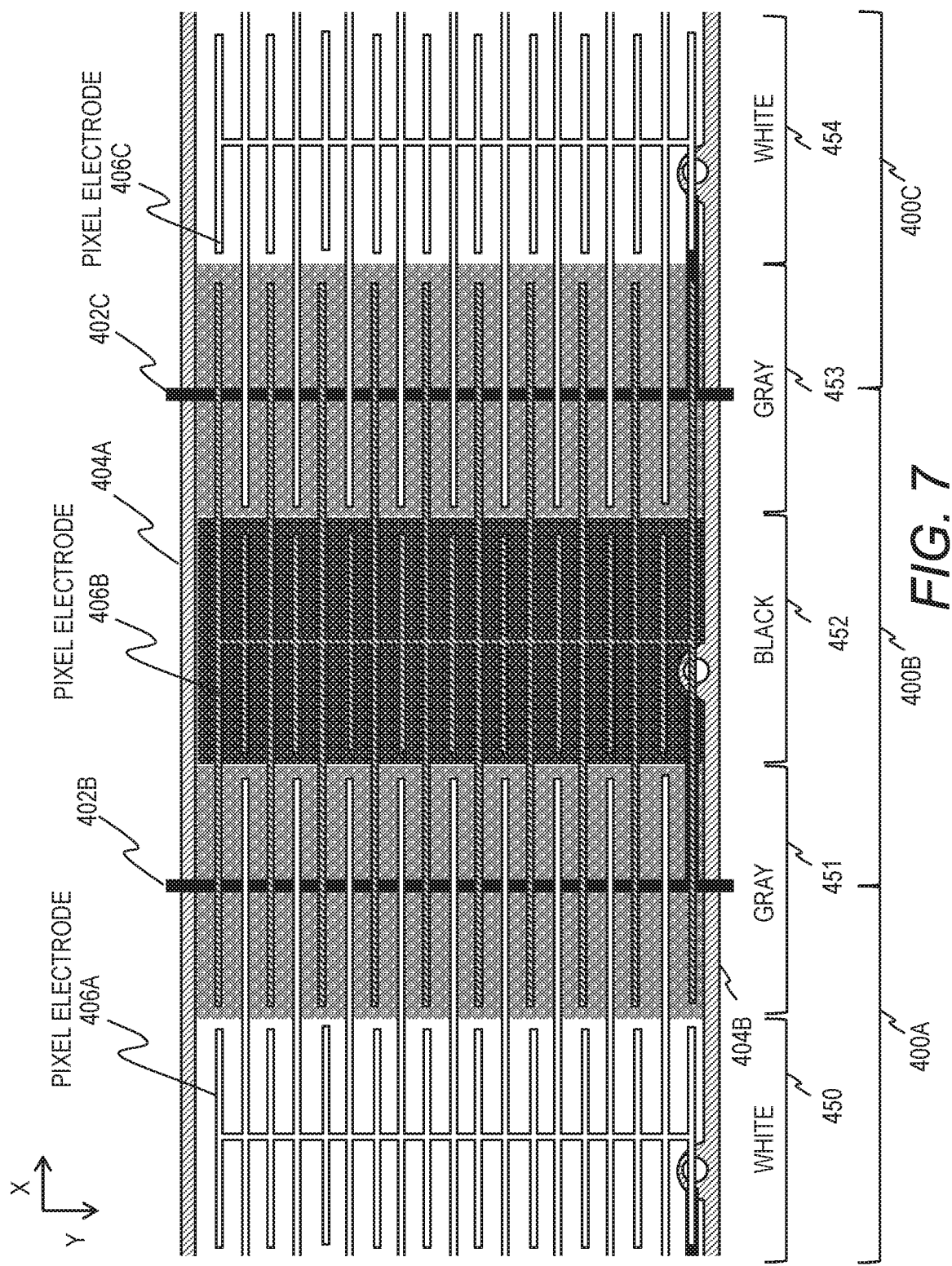
FIG. 7 illustrates an example of the relation between signal potentials supplied to three pixel electrodes and displayed gray levels in a plurality of regions.

FIG. 7 illustrates an example of the relation between signal potentials supplied to three pixel electrodes 406A, 406B, and 406C and displayed gray levels in a plurality of regions. In the example of FIG. 7, the pixel electrodes 406A and 406C are supplied with a signal potential for displaying white (for example, a potential having the largest difference from the common potential) and the pixel electrode 406B is supplied with a signal potential for displaying black (for example, the common potential).

The exclusive regions 450 and 454 of the pixel electrode 406A and 406C display white. The exclusive region 452 of the pixel electrode 406B displays black. The overlap region 451 sandwiched by the exclusive regions 450 and 452 and the overlap region 453 sandwiched by the exclusive regions 452 and 454 display gray.

Referring back to FIG. 5, in the gaps between opposite teeth 521 and 505B located at the border between the exclusive region 452 and the overlap region 451 and the gaps between opposite teeth 505A and 555B located at the border between the exclusive region 452 and the overlap region 453, electric fields generated by the signal potentials supplied to the pixel electrodes are not continued. For this reason, change in orientation of liquid crystal could become intermittent to cause disclination. To address this problem, the pixel electrodes can be provided with not-shown liquid crystal orientation control structures for controlling the orientation of liquid crystal at the tips of the teeth. The same applies to the configuration example in FIG. 6 and the embodiments to be described later. The liquid crystal orientation control structure prevents disclination to achieve display in accordance with signal potentials as illustrated in FIG. 7.

Figure 8:
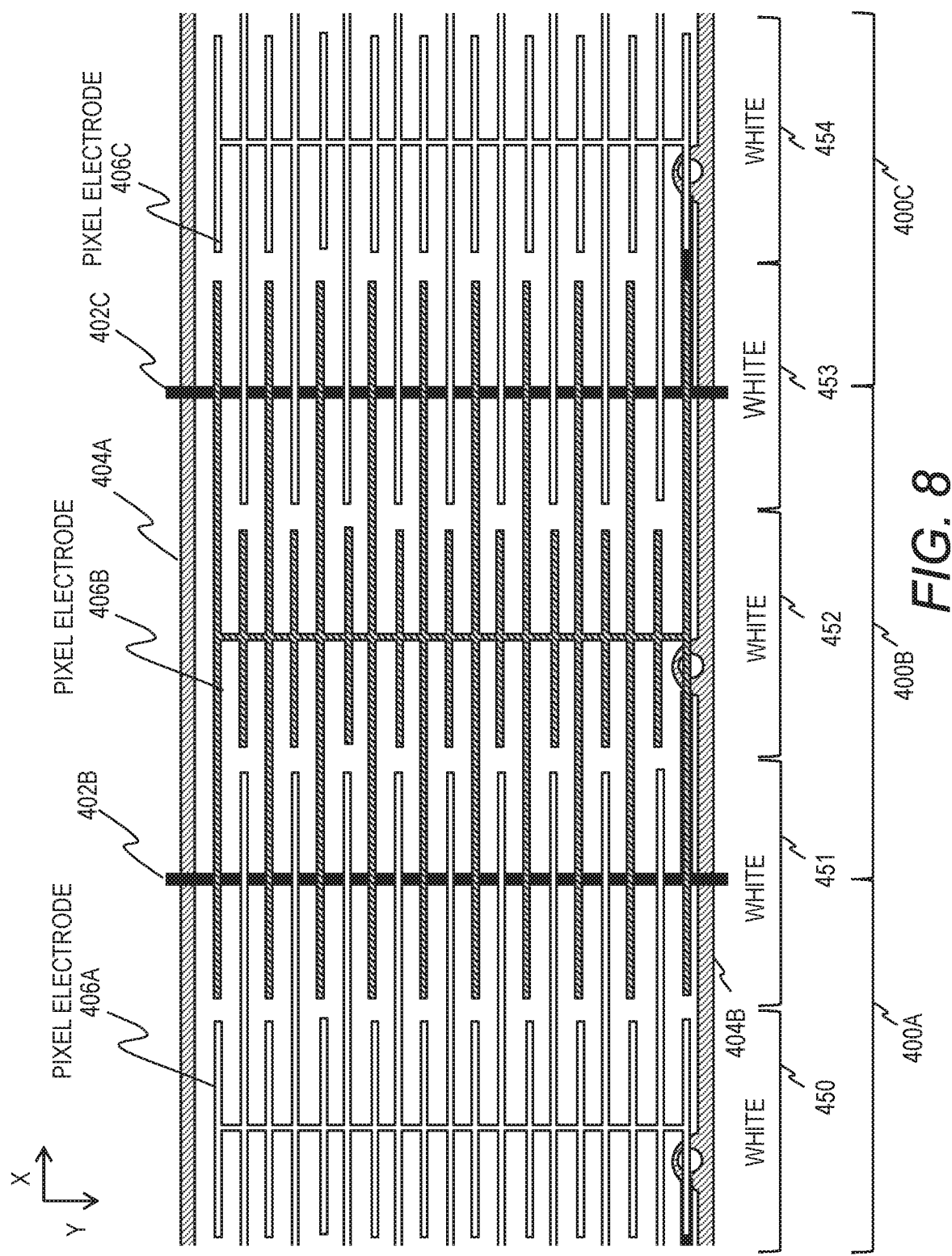
FIG. 8 illustrates another example of the relation between signal potentials supplied to three pixel electrodes and displayed gray levels in a plurality of regions.

FIG. 8 illustrates another example of the relation between signal potentials supplied to three pixel electrodes 406A, 406B, and 406C and displayed gray levels in a plurality of regions. In the example of FIG. 8, the pixel electrodes 406A, 406B, and 406C are supplied with a signal potential for displaying white. The exclusive regions 450, 452 and 454, and the overlap regions 451 and 453 display white. The same description applies to displaying black.

As described above, when two adjacent pixel electrodes are supplied with signal potentials for different gray levels, the overlap region displays an intermediate gray level between the gray levels of the exclusive regions on both sides. When two adjacent pixel electrodes are supplied with signal potentials for the same gray level, the overlap region displays the gray level same as the gray level of the exclusive regions on both sides, so that the two whole pixels display a correct gray level.

Figure 9:
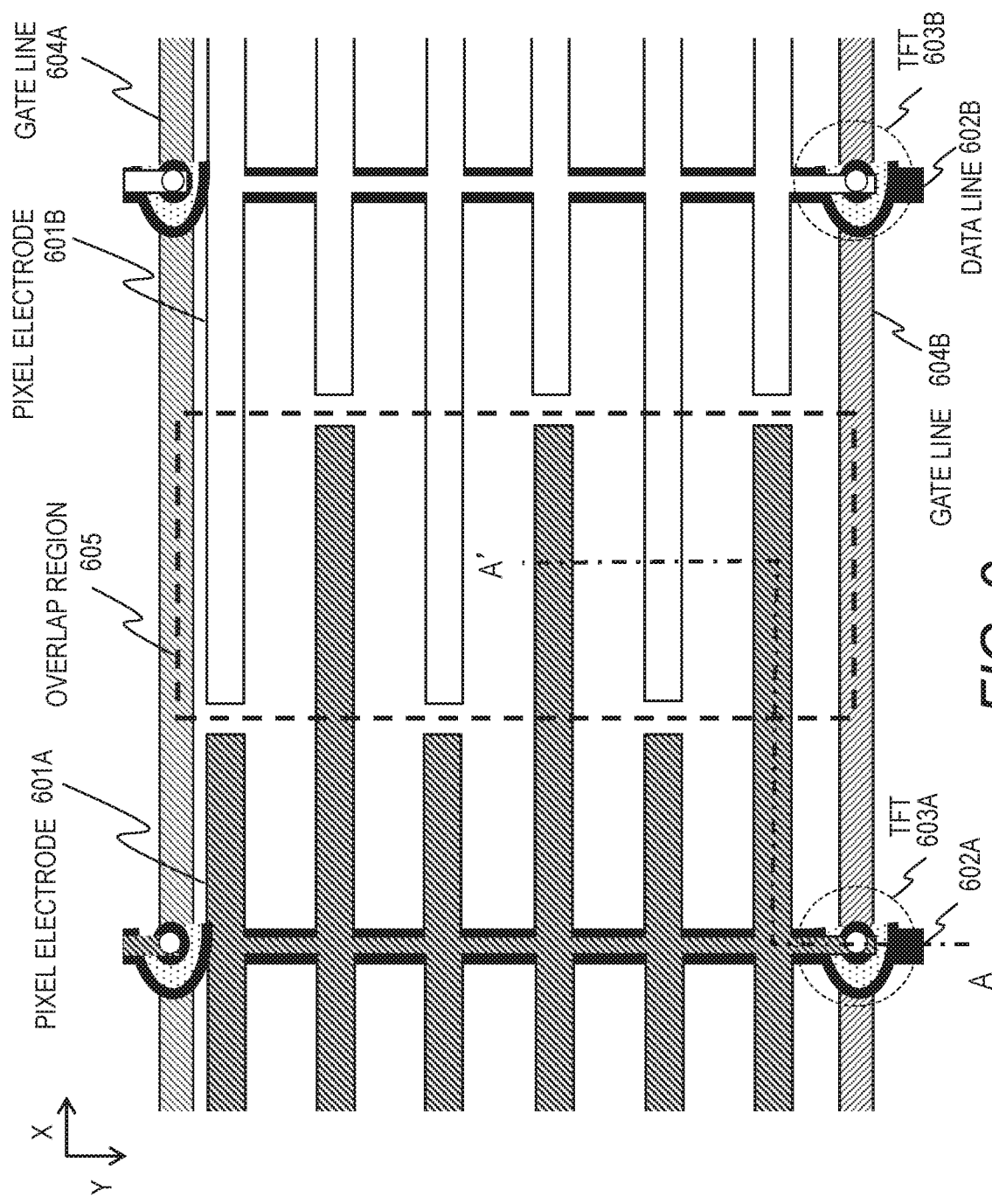
FIG. 9 is a plan diagram schematically illustrating a configuration example of two pixel electrodes adjacent in one pixel electrode row and their peripheral elements.

As described above, grading process can be performed without increasing data lines in order to increase the resolution of the monochrome liquid crystal panel. This configuration prevents the transmittance of the monochrome liquid crystal panel from lowering and further, saves the load of the controller 110 for the diffusion process to the image for the monochrome liquid crystal panel 132. Still further, this configuration allows elimination of the black matrix provided to prevent leakage of light between adjacent pixels; a high aperture ratio (transmittance) is attained. cl Other Embodiments FIG. 9 is a plan diagram schematically illustrating a configuration example of two pixel electrodes 601A and 601B adjacent in one pixel electrode row and their peripheral elements. The pixel electrodes 601A and 601B are disposed between two adjacent gate lines 604A and 604B. The pixel electrodes 601A and 601B have a shape like a comb with teeth on both sides and includes rows of teeth including two kinds of teeth different in length alternately on both sides of the central shaft extending along the Y-axis. In the pixel electrode 601A, short teeth are located at the upper end and long teeth are located at the lower end. In the pixel electrode 601B, long teeth are located at the upper end and short teeth are located at the lower end. The tips of the long teeth of one pixel electrode are opposed to the tips of the short teeth of the other pixel electrode along the X-axis.

FIG. 9 is a modification of the configuration example in FIG. 4A; the shaft of the pixel electrode 601A covers the data line 602A when viewed planarly and the shaft of the pixel electrode 601B covers the data line 602B when viewed planarly. The data line 602A supplies a signal potential to the pixel electrode 601A through a TFT 603A controlled by the gate line 604B. The data line 602B supplies a signal potential to the pixel electrode 601B through a TFT 603B controlled by the gate line 604B.

The pixel electrode 601A and 601B have the identical shapes flipped vertically in the Y-axis direction. Like the configuration example described with reference to FIGS. 5 and 6, the rows of long teeth of the pixel electrodes 601A and 601B overlap in such a manner that they engage each other in an overlap region 605. In the overlap region 605, each part including the tip of a tooth of the pixel electrodes 601A and 601B is located between adjacent long teeth of the other pixel electrode or between a long teeth of the other pixel electrode and a gate line.

Figure 10:
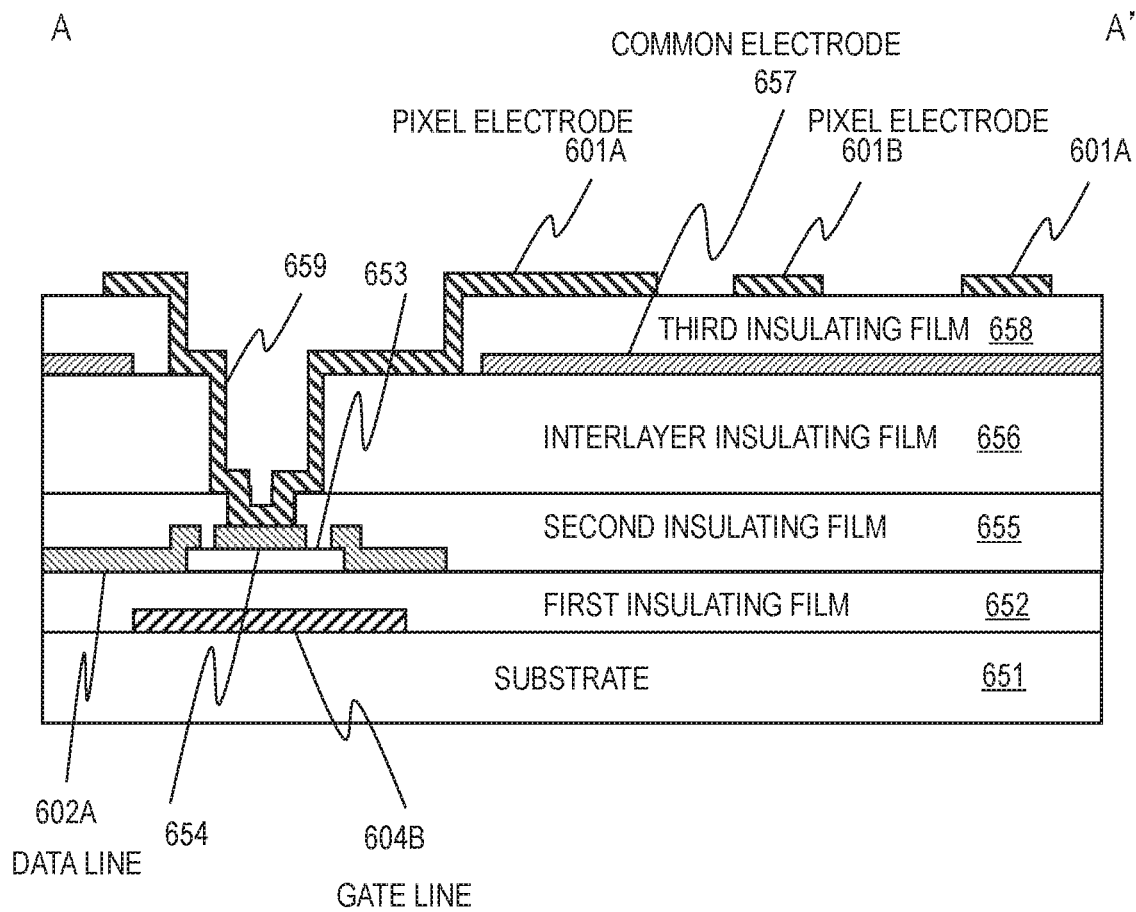
FIG. 10 is a cross-sectional diagram along the section line A-A' in FIG. 9.

FIG. 10 is a cross-sectional diagram along the section line A-A' in FIG. 9. The liquid crystal panel in this configuration example is of an FFS type. The TFT substrate of the monochrome liquid crystal panel 132 includes an insulating substrate 651. The insulating substrate 651 is an insulative transparent substrate made of glass or resin. A polarizing plate is omitted in FIG. 10. The gate line 604B is provided on the main face of the insulating substrate 651 facing the liquid crystal layer (not shown in FIG. 10). The gate line 604B has a single-layer or multi-layer structure using a metal such as Al, Mo, or Cr or an alloy thereof.

A first insulating film (gate insulating film) 652 is provided to cover the gate line 604B. The first insulating film can be a silicon nitride film or silicon oxide film. A semiconductor film 653 included in the TFT 603A is provided on the first insulating film 652 to overlap the gate line 604B when viewed planarly. Further, the data line 602A is provided on the first insulating film 652 to be in contact with the semiconductor film 653. An interconnector 654 included in the same metal layer as the data line 602A is provided above and in contact with the semiconductor film 653 to be distant from the data line 602A.

A second insulating film 655 and an interlayer insulating film 656 are provided to cover the data line 602A. The second insulating film 655 can be a silicon nitride film or a silicon oxide film; the interlayer insulating film 656 can be an organic film like a polyimide film. The interlayer insulating film 656 is optional.

A common electrode 657 is provided on the interlayer insulating film 656. The common electrode 657 can be made of indium tin oxide (ITO). A third insulating film 658 is provided to cover the common electrode 657. The third insulating film 658 can be a silicon nitride film or a silicon oxide film.

A via hole is opened through the third insulating film 658, the second insulating film 655, and the interlayer insulating film 656 to expose the interconnector 654. A via 659 continued from a pixel electrode 601A is in contact with the interconnector 654 in the via hole. The via 659 and the pixel electrode 601B are included in the same metal layer as the pixel electrode 601A. This metal layer can be made of ITO, for example.

Figure 11:
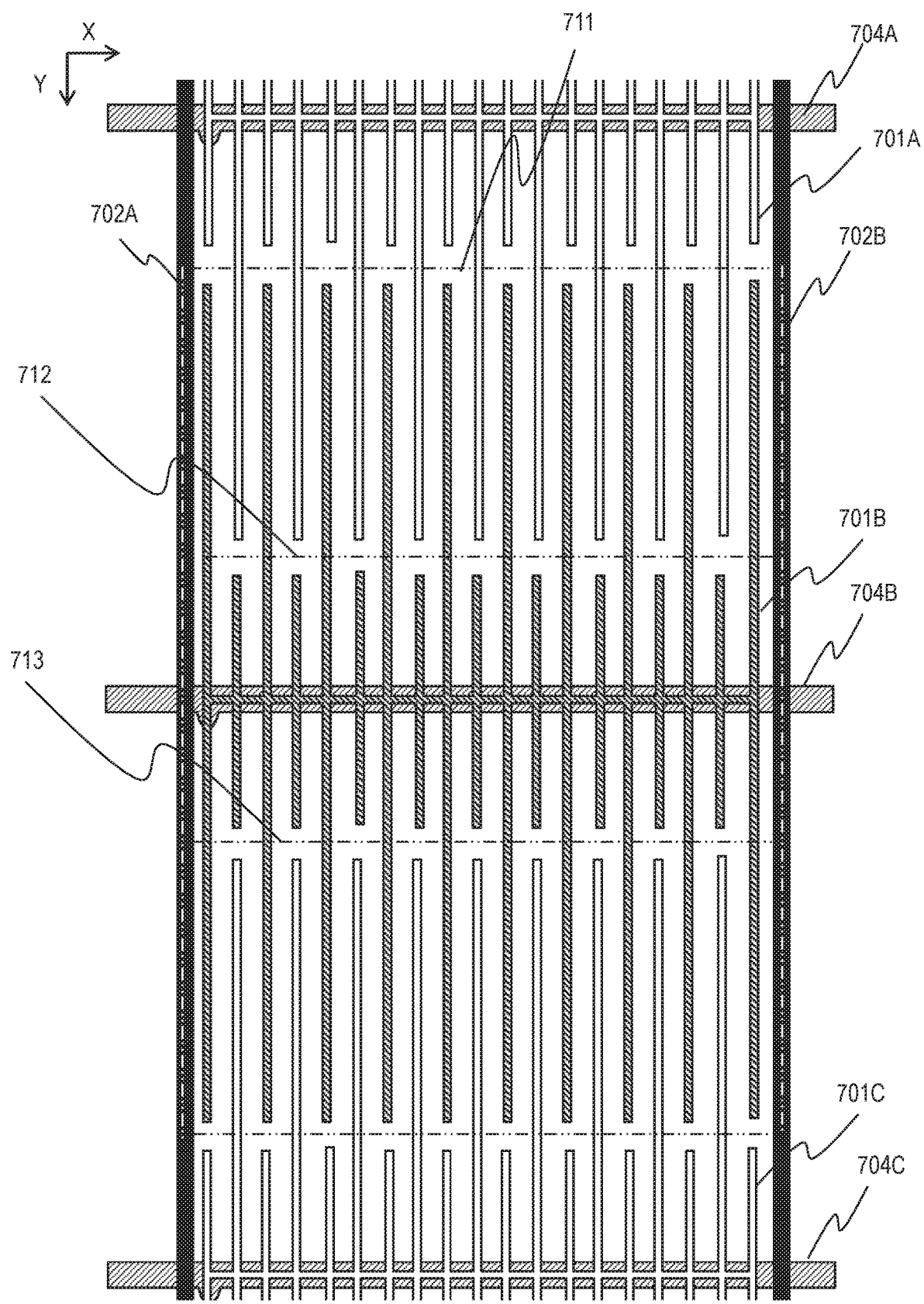
FIG. 11 illustrates another example of the layout of pixel electrodes.

FIG. 11 illustrates another example of the layout of pixel electrodes. In the following, differences from the configuration example illustrated in FIG. 4A are mainly described. Unlike the configuration example in FIG. 4A, pixel electrodes adjacent to each other in a pixel electrode column extending along a data line partially overlap each other.

FIG. 11 illustrates three pixel electrodes 701A, 701B, and 701C consecutive along a data line (the Y-axis). The shapes of the pixel electrodes 701A and 701C are the same as the shapes of the pixel electrodes 401A and 401C described with reference to FIG. 4A. The shape of the pixel electrode 701B is the same as the shape of the pixel electrode 401B described with reference to FIG. 4A.

The orientation of the pixel electrodes 701A, 701B, and 701C with respect to the data lines and the gate lines is rotated from the orientation of the pixel electrodes described with reference to FIG. 4A by 90°. The shafts of the pixel electrodes 701A, 701B, and 701C extend along a gate line (the X-axis) and the teeth extend along a data line (the Y-axis). The pixel electrodes 701A, 701B, and 701C are provided between data lines 702A and 702C adjacent to each other. The shafts of the pixel electrodes 701A, 701B, and 701C lie above the gate lines 704A, 704B, and 704C, respectively, when viewed planarly.

One of the rows of teeth of the pixel electrode 701A and one of the rows of teeth of the pixel electrode 701B overlap in an overlap region 711. The manner of overlap is as described with reference to FIG. 5 or 6. In the example in FIG. 11, the teeth of the pixel electrode 701B and the teeth of the pixel electrode 701A are disposed alternately along a gate line.

An exclusive region 712 includes a part of the pixel electrode 701B and does not include any other pixel electrode. Specifically, the exclusive region 712 includes the shaft, the entireties of all short teeth, and parts of the long teeth closer to the shaft of the pixel electrode 701B.

The other row of teeth of the pixel electrode 701B and one of the rows of teeth of the pixel electrode 701C overlap in an overlap region 713. The manner of overlap is as described with reference to FIG. 5 or 6. In the example in FIG. 11, the teeth of the pixel electrode 701B and the teeth of the pixel electrode 701C are disposed alternately along a gate line.

In the configuration example in FIG. 11, overlap regions and exclusive regions are disposed alternately in each pixel electrode column. Each exclusive region includes a part of the corresponding pixel electrode and does not include the remaining part of the pixel electrode or any other pixel electrode. Each overlap region includes teeth of two pixel electrodes adjacent along a data line and their teeth are disposed alternately along a gate line. The total area sizes of the teeth-like electrodes are substantially equal among the overlap regions and the exclusive regions.

As described above, an overlap region includes two pixel electrodes (part thereof) adjacent to each other in a pixel electrode column extending along the Y-axis (a data line). The driver circuit 138 supplies a pixel electrode column extending along the Y-axis with signal potentials having the same polarity with respect to the common potential and its adjacent pixel columns with signal potentials having the same or opposite polarity with respect to the common potential. The driver circuit 138 alternates the polarities of the signal potential to be supplied to each electrode frame by frame.

Since the two pixel electrodes in an overlap region are supplied with signal potentials of the same polarity, the liquid crystal in the overlap region is supplied with a signal potential intermediate between the signal potentials in the exclusive regions of the two pixel electrodes. That is to say, the gray level of the overlap region between the exclusive regions is a level intermediate between the gray levels of the two exclusive regions. When two adjacent pixel electrodes are supplied with signal potentials for the same gray level, the overlap region displays the gray level same as the gray level of the exclusive regions on both sides, so that the two whole pixels display a correct gray level.

As illustrated in FIGS. 4A and 11, pixel electrodes can be disposed so that adjacent pixel electrodes partially overlap each other in either a pixel electrode line (pixel electrode row) composed of pixel electrodes disposed along a data line or a pixel electrode line (pixel electrode column) composed of pixel electrodes disposed along a gate line.

Figure 12:
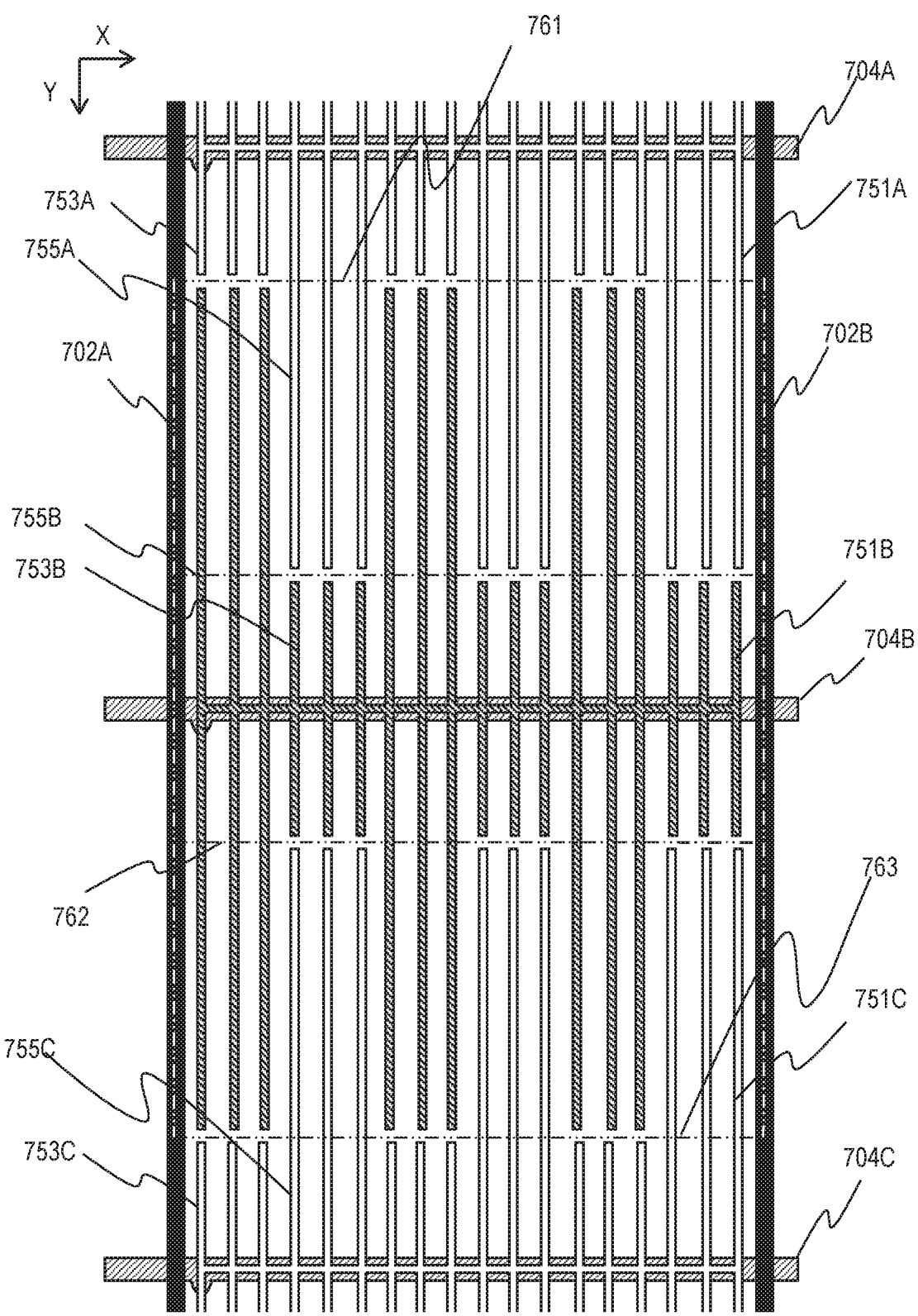
FIG. 12 illustrates other examples of the shapes of pixel electrodes.

FIG. 12 illustrates other examples of the shapes of pixel electrodes. Differences from the configuration example illustrated in FIG. 11 are mainly described in the following. The pixel electrode 751A is different from the pixel electrode 701A in the disposition of the teeth and is the same in the remaining. The pixel electrode 751B is different from the pixel electrode 701B in the disposition of the teeth and is the same in the remaining. The pixel electrode 751C is different from the pixel electrode 701C in the disposition of the teeth and is the same in the remaining.

In FIG. 12, one of the short teeth of the pixel electrode 751A is provided with a reference sign 753A and one of the long teeth is provided with a reference sign 755A, by way of example; one of the short teeth of the pixel electrode 751B is provided with a reference sign 753B and one of the long teeth is provided with a reference sign 755B, by way of example; and one of the short teeth of the pixel electrode 751C is provided with a reference sign 753C and one of the long teeth is provided with a reference sign 755C, by way of example. The pixel electrodes 751A and 751C have identical shapes.

Each row of teeth of the pixel electrode 751A is composed of groups of three consecutive short teeth and groups of three consecutive long teeth disposed alternately. Each row of teeth of the pixel electrode 751B is composed of groups of three consecutive long teeth and groups of three consecutive short teeth disposed alternately. Each row of teeth of the pixel electrode 751C is composed of groups of three consecutive short teeth and groups of three consecutive long teeth disposed alternately.

In the overlap region 761, first groups each consisting of parts of three long teeth of the pixel electrode 751B and second groups each consisting of parts of three long teeth of the pixel electrode 751A are disposed alternately. In the overlap region 763, first groups each consisting of parts of three long teeth of the pixel electrode 751B and second groups each consisting of parts of three long teeth of the pixel electrode 751C are disposed alternately. The disposition of the pixel electrode in an exclusive region 762 is the same as the configuration example in FIG. 11.

As described above, in the overlap regions 761 and 763 in the configuration example in FIG. 12, the teeth of two adjacent pixel electrodes are disposed alternately in units of a plurality of teeth. In the configuration example in FIG. 12, the areas of the two pixel electrodes in the overlap regions 761 and 763 are equal. Specifically, in the overlap region 761, the number and the area of the teeth of the pixel electrode 751A are equal to the number and the area of the teeth of the pixel electrode 751B. In similar, in the overlap region 763, the number and the area of the teeth of the pixel electrode 751C are equal to the number and the area of the teeth of the pixel electrode 751B.

Although each example of the shape of a pixel electrode illustrated in FIG. 12 has a group of teeth consisting of three teeth, the number of teeth in a group can be different from three. A row of teeth can include groups of different numbers of teeth. The pixel electrodes having the shapes as illustrated in FIG. 12 are applicable to the pixel electrode layout illustrated in FIG. 4A.

Figure 13:
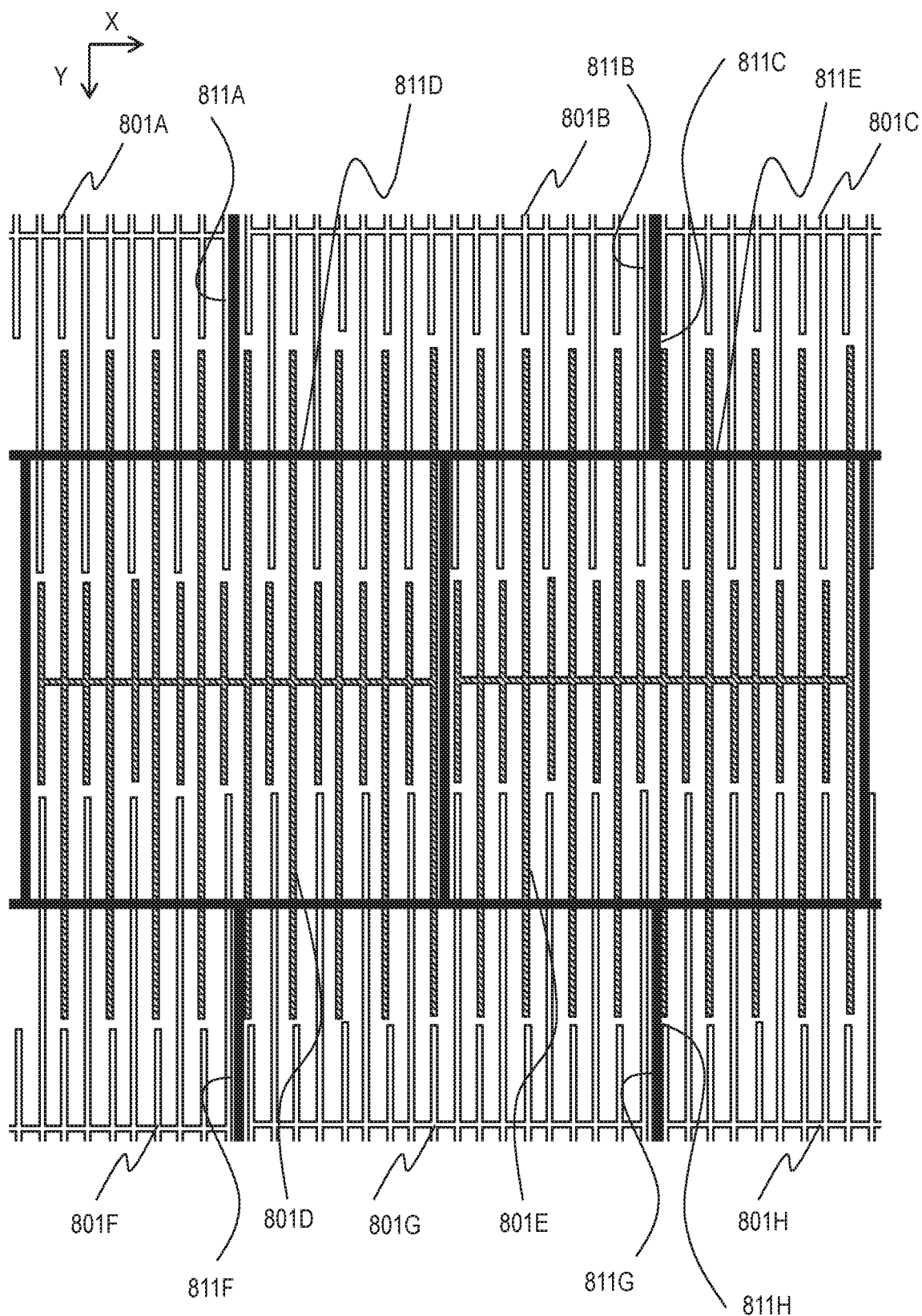
FIG. 13 illustrates still another example of the layout of pixel electrodes.

FIG. 13 illustrates still another example of the layout of pixel electrodes. In the foregoing layout examples, one pixel electrode overlap two pixel electrodes on both sides. In the layout example in FIG. 13, one pixel electrode partially overlap two pixel electrodes on either side. The liquid crystal panel is of an FFS type.

FIG. 13 illustrates a layout of pixel electrodes 801A to 801H. Each of the pixel electrodes 801A to 801H has a shape like a comb having teeth on both sides. The pixel electrodes 801A, 801B, and 801C are included in one pixel electrode row extending along the X-axis. The pixel electrodes 801D and 801E are included in another pixel electrode row extending along the X-axis. The pixel electrodes 801F, 801G, and 801H are included in still another pixel electrode row extending along the X-axis. The pixel electrodes 801A to 801H are disposed in a staggered layout. Between two adjacent pixel electrode rows, the positions along the X-axis of the pixel electrodes are different by a half pixel (a half pitch).

In the configuration example in FIG. 13, a pixel electrode column extending along the Y-axis is composed of pixel electrodes located at two different X-coordinates alternately. For example, the pixel electrodes 801A, 801D, and 801F are pixel electrodes consecutive in one pixel electrode column and the pixel electrodes 801B, 801E, and 801G are pixel electrodes consecutive in another pixel electrode column.

The boundaries of pixel regions are denoted by thick lines; the pixel regions 811A to 811H are associated with the pixel electrodes 801A to 801H, respectively. Each pixel region includes five pixel electrodes (parts thereof). For example, the pixel region 811D includes parts of the pixel electrodes 801A, 801B, 801D, 801F, and 801G and the pixel region 811E includes parts of the pixel electrodes 801B, 801C, 801E, 801G, and 801H. Although not shown in FIG. 13, the gate lines extend along the X-axis and the data lines extend along the Y-axis.

In the layout in FIG. 13, a pixel electrode partially overlaps four pixel electrodes adjacent to the pixel electrode along the Y-axis. Two of the four pixel electrodes are included in one of two pixel electrode rows adjacent to each other and the other two are included in the other pixel electrode row. The X-coordinate and the Y-coordinate of the centroid of the pixel electrode are different from the X-coordinates and the Y-coordinates of the centroids of the four pixel electrodes.

For example, the pixel electrode 801D partially overlap the pixel electrodes 801A, 801B, 801F, and 801G. The centroid of the pixel electrode 801D are located at an X-coordinate and a Y-coordinate different from the X-coordinates and the Y-coordinates of the centroids of the pixel electrodes 801A, 801B, 801F, and 801G. The centroids of the pixel electrodes 801A and 801B are located at the same Y-coordinate but different X-coordinates. The centroids of the pixel electrodes 801A and 801F are located at the same X-coordinate but different Y-coordinates. The centroids of the pixel electrodes 801B and 801G are located at the same X-coordinate and different Y-coordinates. The centroids of the pixel electrodes 801F and 801G are located at the same Y-coordinate but different X-coordinates.

For example, the pixel electrode 801E partially overlap the pixel electrodes 801B, 801C, 801G, and 801H. The centroid of the pixel electrode 801E are located at an X-coordinate and a Y-coordinate different from the X-coordinates and the Y-coordinates of the centroids of the pixel electrodes 801B, 801C, 801G, and 801H. The centroids of the pixel electrodes 801B and 801C are located at the same Y-coordinate but different X-coordinates. The centroids of the pixel electrodes 801C and 801H are located at the same X-coordinate but different Y-coordinates. The centroids of the pixel electrodes 801B and 801G are located at the same X-coordinate but different Y-coordinates. The centroids of the pixel electrodes 801G and 801H are located at the same Y-coordinate but different X-coordinates.

The driver circuit 138 supplies all pixel electrodes with signal potentials having the same polarity with respect to the common potential. The driver circuit 138 alternates the polarities of the signal potential to be supplied to each electrode frame by frame. The layout in FIG. 13 produces pairs of partially overlapping pixel electrodes having different X-coordinates and Y-coordinates to attain intermediate gray levels between adjacent pixels in both directions along the X-axis and both directions along Y-axis.

Figure 14:
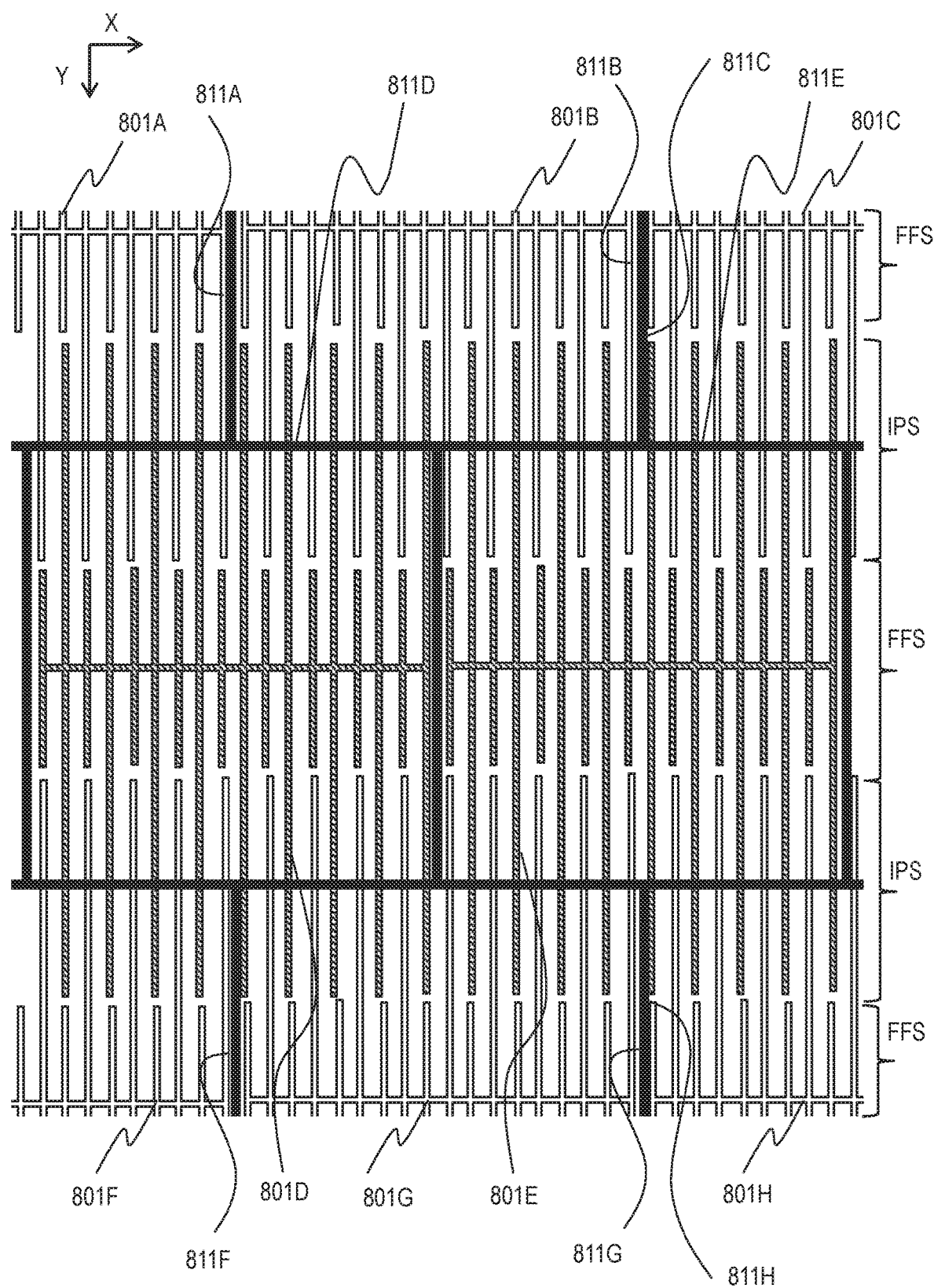
FIG. 14 illustrates an example employing driving methods of both IPS and FFS in the pixel electrode layout illustrated in FIG. 13.

FIG. 14 illustrates an example employing driving methods of both IPS and FFS in the pixel electrode layout illustrated in FIG. 13. The shapes and the layout of the pixel electrodes in FIG. 14 are the same as those in the example in FIG. 13. The layouts of the not-shown common electrodes are different between the configuration examples in FIGS. 13 and 14.

As illustrated in FIG. 14, the exclusive region in the middle of each pixel operates as an FFS region. Specifically, an electric field to be applied to liquid crystal is generated between the pixel electrode and a not-shown common electrode provided on a layer different from (for example, lower than) the layer of the pixel electrode. An FFS-type of liquid crystal panel has two electrodes constituting an electrode pair for applying an electric field to liquid crystal in different layers (on different insulating films).

Meanwhile, the overlap region operates as an IPS region. Specifically, no common electrode is provided in the overlap region and an electric field to be applied to liquid crystal is generated between different pixel electrodes included in the overlap region. An IPS-type of liquid crystal panel has two electrodes constituting an electrode pair for applying an electric field to liquid crystal in the same layer (on the same insulating film).

When the polarities of the signal potentials for pixel electrodes adjacent to each other are different, the exclusive region in the middle of each pixel operates as an FFS region, and therefore, the liquid crystal there is driven by low voltage between the pixel electrode and the common electrode. However, the overlap region operates as an IPS region; the liquid crystal there is driven by the potential difference between the signal potentials for the pixel electrodes adjacent to each other. The potential difference between the adjacent pixel electrodes is larger than the potential difference between the pixel electrode and the common electrode.

To drive liquid crystal having the same Ac by IPS and FFS, the driving voltage by IPS tends to be higher than the driving voltage by FFS. Accordingly, the overlap region as an IPS region requires higher driving voltage than the exclusive region as an FFS region. Supplying the overlapping pixel electrodes adjacent to each other with signal potentials of the opposite polarities enables the IPS overlap region to be driven by the maximum voltage.

In the example of the staggered layout illustrated in FIGS. 13 and 14, the positions of the pixel electrodes are different by a half pixel (a half pitch) along the X-axis (a gate line) between adjacent pixel electrode rows. In another example of the staggered layout, the positions of the pixel electrodes are different by a half pixel (a half pitch) along the Y-axis (a data line) between adjacent pixel electrode columns. In this example, each pixel electrode is isolated from the pixel electrodes adjacent thereto along a data line and partially overlap four pixel electrodes adjacent thereto along gate lines.

The above-described configuration example enables grading process to be performed without increasing data lines in order to increase the resolution of the monochrome liquid crystal panel and prevents the transmittance of the monochrome liquid crystal panel from lowering. Further, this configuration saves the load of the controller 110 for the diffusion process to the image for the monochrome liquid crystal panel. Still further, this configuration allows elimination of the black matrix provided to prevent leakage of light between adjacent pixels; a high aperture ratio (transmittance) is attained.

Figure 15:
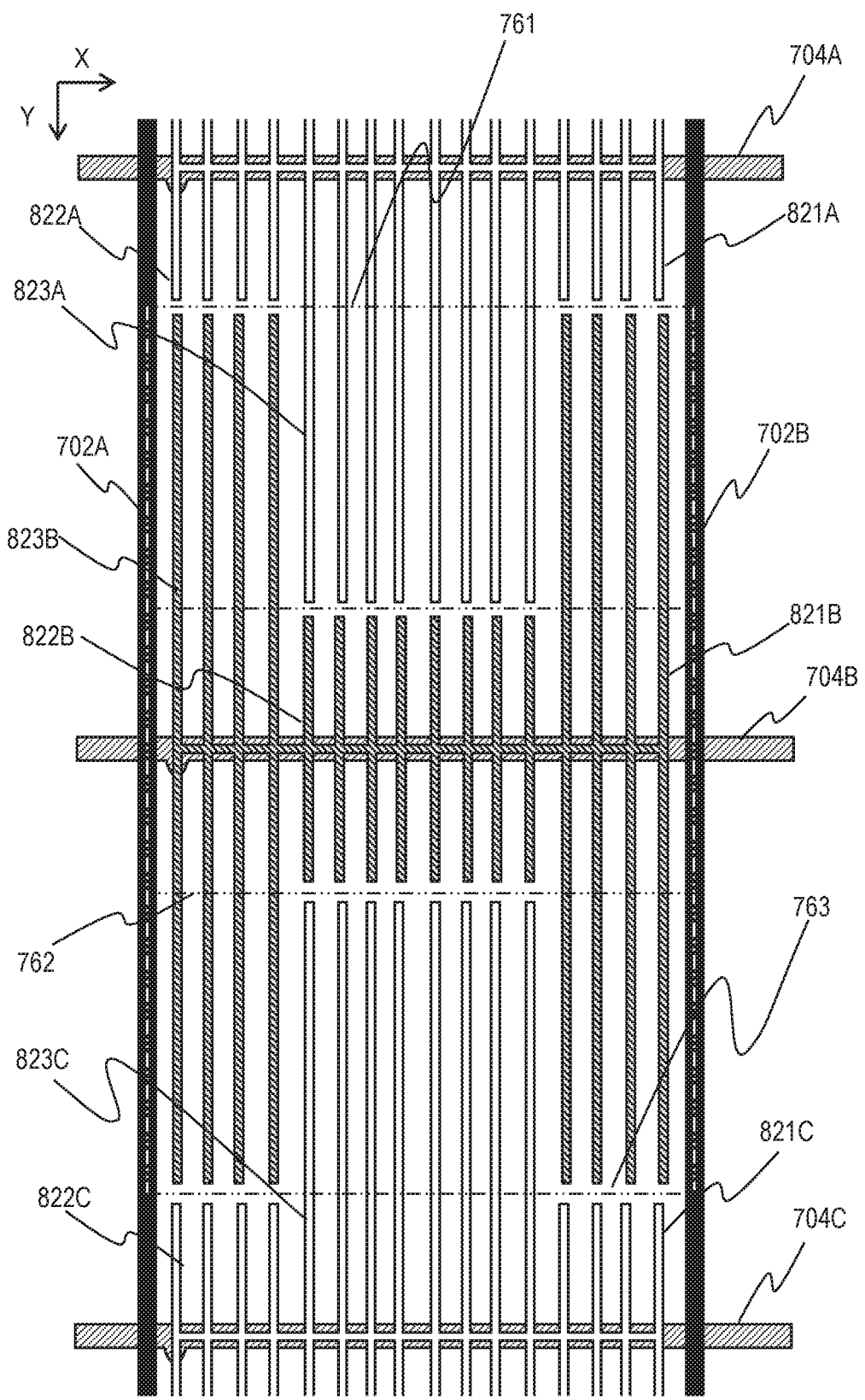
FIG. 15 illustrates still other examples of the shapes of pixel electrodes.

FIG. 15 illustrates still other examples of the shapes of pixel electrodes. Differences from the configuration example illustrated in FIG. 11 are mainly described in the following. The pixel electrode 821A is different from the pixel electrode 701A in the disposition of the teeth and is the same in the remaining. The pixel electrode 821B is different from the pixel electrode 701B in the disposition of the teeth and is the same in the remaining. The pixel electrode 821C is different from the pixel electrode 701C in the disposition of the teeth and is the same in the remaining.

In FIG. 15, one of the short teeth of the pixel electrode 821A is provided with a reference sign 822A and one of the long teeth is provided with a reference sign 823A, by way of example; one of the short teeth of the pixel electrode 821B is provided with a reference sign 822B and one of the long teeth is provided with a reference sign 823B, by way of example; and one of the short teeth of the pixel electrode 821C is provided with a reference sign 822C and one of the long teeth is provided with a reference sign 823C, by way of example. The pixel electrodes 821A and 821C have identical shapes.

Each row of teeth of the pixel electrode 821A consists of two groups composed of four consecutive short teeth 822A and one group composed of eight consecutive long teeth 823A sandwiched by the two groups. Each row of teeth of the pixel electrode 821B consists of two groups composed of four consecutive long teeth 823B and one group composed of eight consecutive short teeth 822B sandwiched by the two groups. Each row of teeth of the pixel electrode 821C consists of two groups composed of four consecutive short teeth 822C and one group composed of eight consecutive long teeth 823C sandwiched by the two groups.

In the overlap region 761, two groups each consisting of parts of four long teeth 823B of the pixel electrode 821B and a group consisting of parts of eight long teeth 823A of the pixel electrode 821A sandwiched by the two groups are disposed. In the overlap region 763, two groups each consisting of parts of four long teeth 823B of the pixel electrode 821B and a group consisting of parts of eight long teeth 823C of the pixel electrode 821C sandwiched by the two groups are disposed.

In the overlap regions 761 and 763 in the configuration example in FIG. 15, a plurality of teeth of one of the two adjacent pixel electrodes are sandwiched by groups composed of a plurality of teeth of the other pixel electrode. In the configuration example in FIG. 15, the areas of the two pixel electrodes in the overlap regions 761 and 763 are equal. Specifically, in the overlap region 761, the number and the area of the teeth of the pixel electrode 821A are equal to the number and the area of the teeth of the pixel electrode 821B. In similar, in the overlap region 763, the number and the area of the teeth of the pixel electrode 821C are equal to the number and the area of the teeth of the pixel electrode 821B.

Although each example of the shape of a pixel electrode illustrated in FIG. 15 has a group of teeth consisting of four or eight teeth, the number of teeth in a group can be different from four or eight. A row of teeth can include groups of different numbers of teeth. The pixel electrodes having the shapes as illustrated in FIG. 15 are applicable to the pixel electrode layout illustrated in FIG. 4A.

Figure 16:
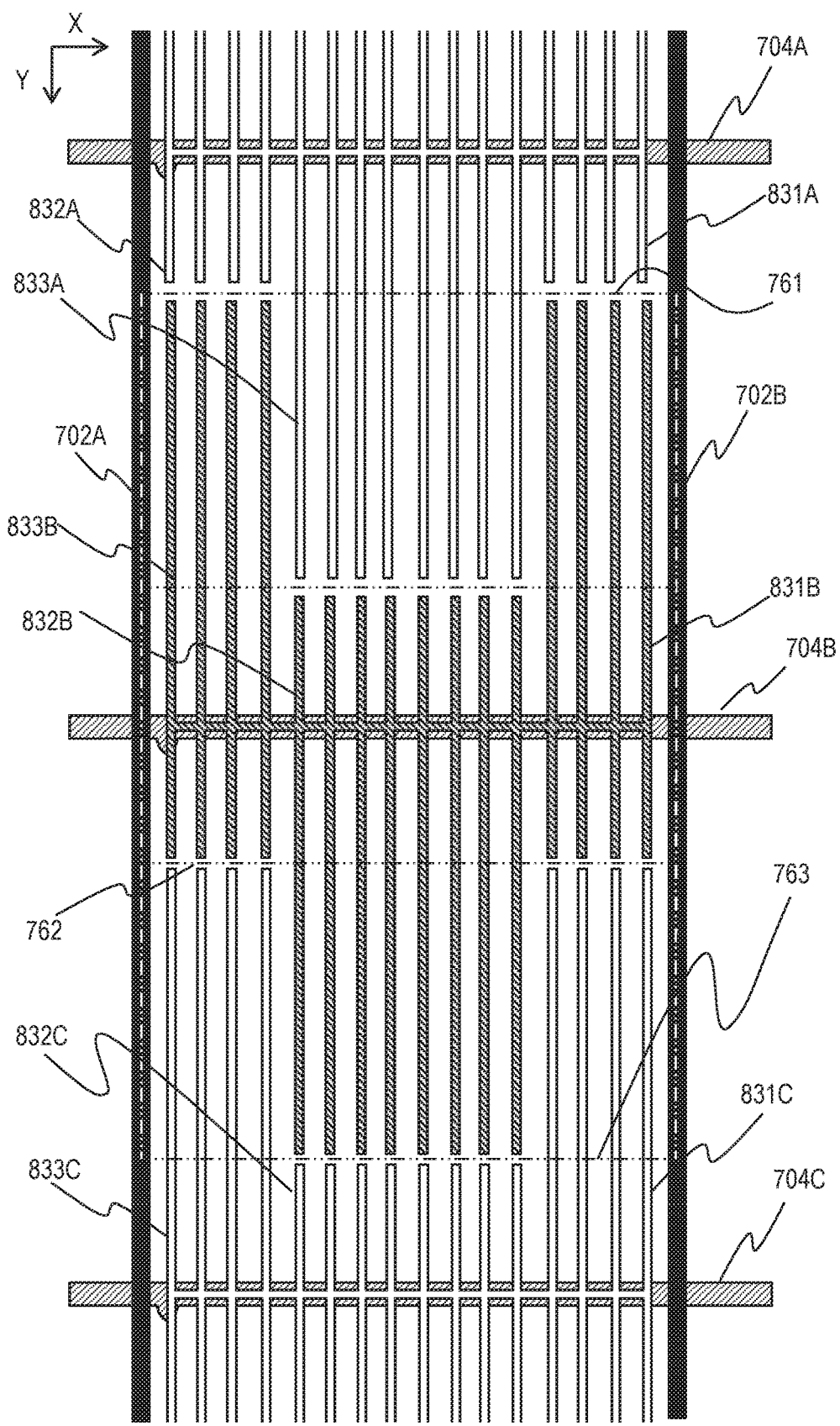
FIG. 16 illustrates still other examples of the shapes of pixel electrode.

FIG. 16 illustrates still other examples of the shapes of pixel electrodes. Differences from the configuration example illustrated in FIG. 11 are mainly described in the following. The pixel electrode 831A is different from the pixel electrode 701A in the disposition of the teeth and is the same in the remaining. The pixel electrode 831B is different from the pixel electrode 701B in the disposition of the teeth and is the same in the remaining. The pixel electrode 831C is different from the pixel electrode 701C in the disposition of the teeth and is the same in the remaining. Although the pixel electrodes 701A to 701C have shapes symmetric about their shafts, the pixel electrodes 831A to 831C have asymmetric shapes about their shafts.

In FIG. 16, one of the short teeth of the pixel electrode 831A is provided with a reference sign 832A and one of the long teeth is provided with a reference sign 833A, by way of example; one of the short teeth of the pixel electrode 831B is provided with a reference sign 832B and one of the long teeth is provided with a reference sign 833B, by way of example; and one of the short teeth of the pixel electrode 831C is provided with a reference sign 832C and one of the long teeth is provided with a reference sign 833C, by way of example. The pixel electrodes 831A, 831B, and 831C have identical shapes.

One of the rows of teeth of the pixel electrode 831A consists of two groups composed of four consecutive long teeth 833A and one group composed of eight consecutive short teeth 832A sandwiched between the two groups. The other row of teeth of the pixel electrode 831A consists of two groups composed of four consecutive short teeth 832A and a group composed of eight consecutive long teeth 833A sandwiched by the two groups. In the example in FIG. 16, the short teeth 832A of one row and the long teeth 833A of the other row are disposed at the same positions with respect to the shaft. The rows of teeth of the pixel electrodes 831B and 831C have the identical structures as the rows of teeth of the pixel electrode 831A.

In the overlap region 761, two groups each consisting of parts of four long teeth 833B of the pixel electrode 831B and a group consisting of parts of eight long teeth 833A of the pixel electrode 831A sandwiched by the two groups are disposed. In the overlap region 763, two groups each consisting of parts of four long teeth 833C of the pixel electrode 831C and a group consisting of parts of eight long teeth 833B of the pixel electrode 831B sandwiched by the two groups are disposed.

In the overlap regions 761 and 763 in the configuration example in FIG. 16, a plurality of teeth of one of the two adjacent pixel electrodes are sandwiched by groups composed of a plurality of teeth of the other pixel electrode. In the configuration example in FIG. 16, the areas of the two pixel electrodes in the overlap regions 761 and 763 are equal. Specifically, in the overlap region 761, the number and the area of the teeth of the pixel electrode 831A are equal to the number and the area of the teeth of the pixel electrode 831B. In similar, in the overlap region 763, the number and the area of the teeth of the pixel electrode 831C are equal to the number and the area of the teeth of the pixel electrode 831B.

Although the example of the shape of a pixel electrode illustrated in FIG. 16 has a group of teeth consisting of four or eight teeth, the number of teeth in a group can be a number different from four or eight. A row of teeth can include groups of different numbers of teeth. The pixel electrodes having the shape as illustrated in FIG. 16 are applicable to the pixel electrode layout illustrated in FIG. 4A.

Figure 17:
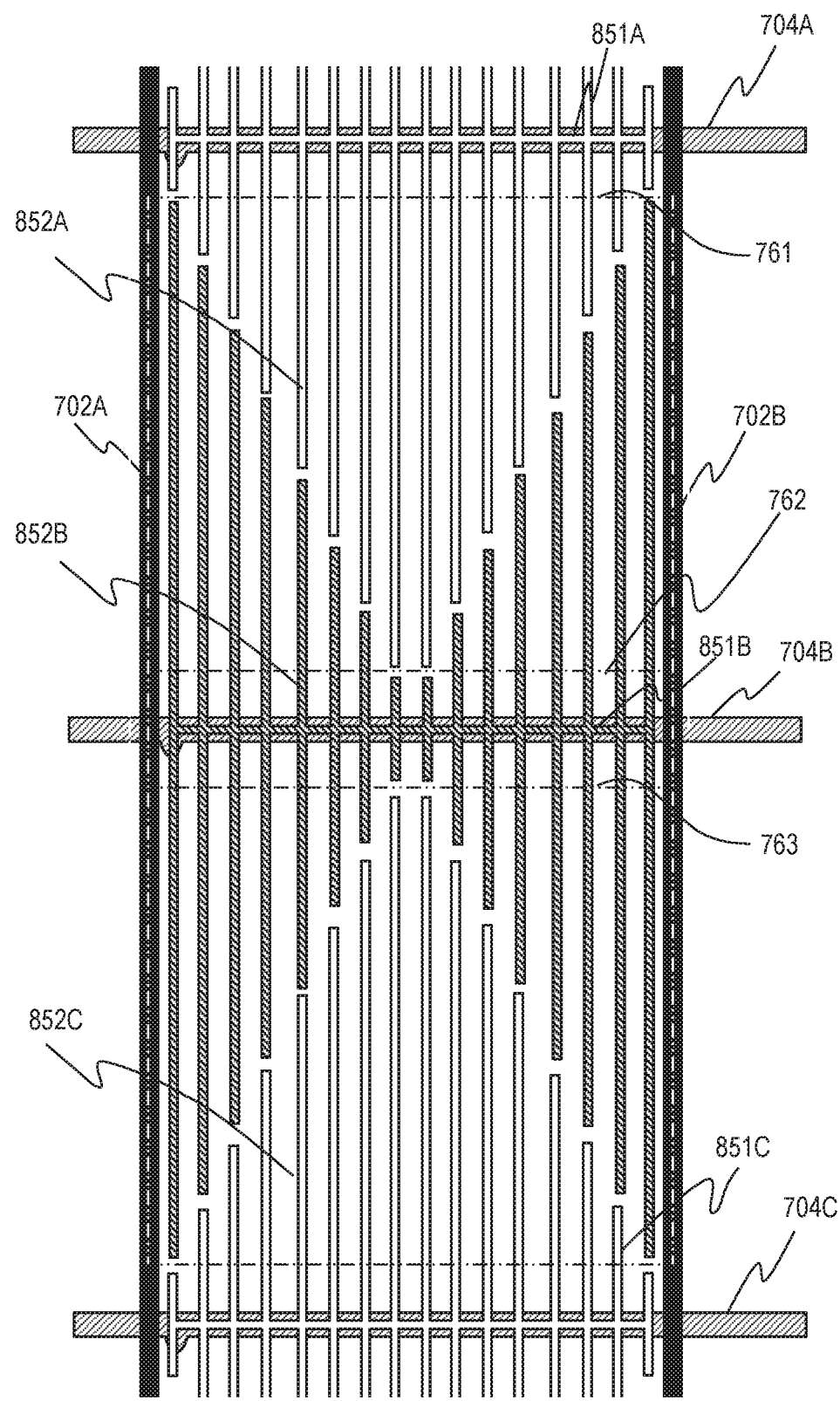
FIG. 17 illustrates still other examples of the shapes of pixel electrodes.

FIG. 17 illustrates still other examples of the shapes of pixel electrodes. Differences from the configuration example illustrated in FIG. 11 are mainly described in the following. The pixel electrode 851A is different from the pixel electrode 701A in the disposition of the teeth and is the same in the remaining. The pixel electrode 851B is different from the pixel electrode 701B in the disposition of the teeth and is the same in the remaining. The pixel electrode 851C is different from the pixel electrode 701C in the disposition of the teeth and is the same in the remaining.

In FIG. 17, one of the teeth of each of the pixel electrodes 851A, 851B, and 851C is provided with a reference sign 852A, 852B, and 852C, respectively, by way of example.

The pixel electrode 851A has a two-fold symmetric shape. Specifically, the teeth of the pixel electrode 851A are disposed in a diamond shape; the teeth 852A become gradually shorter from the ones disposed at the midpoint of the shaft to the ones disposed at its ends. In the example in FIG. 17, the pixel electrode 851A has sixteen teeth 852A on either side. The pixel electrode 851C has the identical shape to the pixel electrode 851A.

The pixel electrode 851B has a two-fold symmetric shape. Specifically, the teeth of the pixel electrode 851B are disposed in a shape like an hourglass whose center is narrowed; the teeth 852B become gradually longer from the ones disposed at the midpoint of the shaft to the ones disposed at its ends. In the example in FIG. 17, the pixel electrode 851B has sixteen teeth 852B on either side.

The configuration example in FIG. 17 has wide overlap regions 761 and 763 and a narrow exclusive region 762, compared to the configuration example in FIG. 11. For this reason, more natural display is attained by smoothing the brightness. The areas of the two pixel electrodes in the overlap regions 761 and 763 are equal. Specifically, in the overlap region 761, the total area of the teeth of the pixel electrode 851A is equal to the total area of the teeth of the pixel electrode 851B. In similar, in the overlap region 763, the total area of the teeth of the pixel electrode 851C is equal to the total area of the teeth of the pixel electrode 851B. The pixel electrodes having the shapes as illustrated in FIG. 17 are applicable to the pixel electrode layout illustrated in FIG. 4A.

Figure 18:
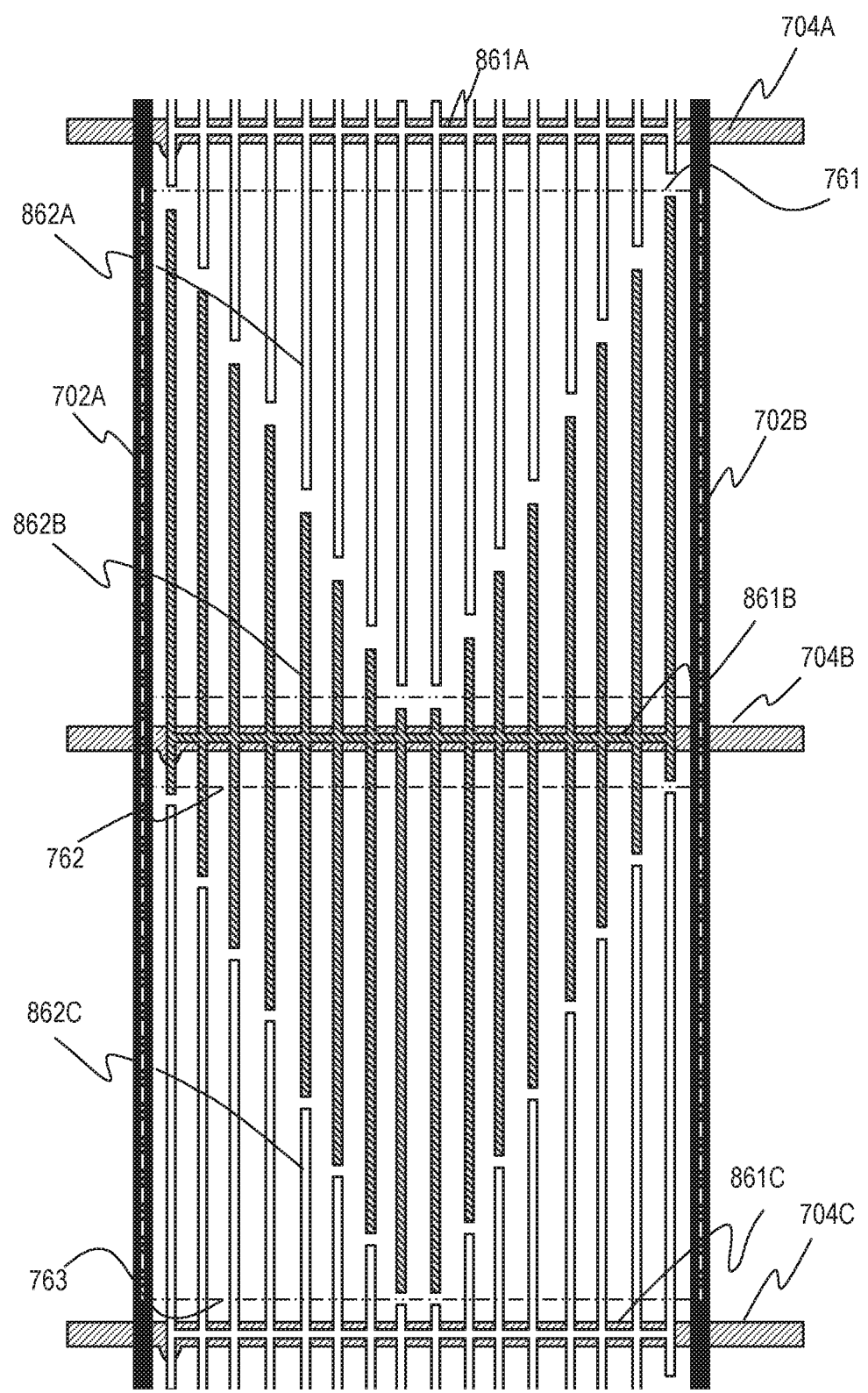
FIG. 18 illustrates still other examples of the shapes of pixel electrodes.

FIG. 18 illustrates still other examples of the shapes of pixel electrodes. Differences from the configuration example illustrated in FIG. 11 are mainly described in the following. The pixel electrode 861A is different from the pixel electrode 701A in the disposition of the teeth and is the same in the remaining. The pixel electrode 861B is different from the pixel electrode 701B in the disposition of the teeth and is the same in the remaining. The pixel electrode 861C is different from the pixel electrode 701C in the disposition of the teeth and is the same in the remaining.

In FIG. 18, one of the teeth of each of the pixel electrodes 861A, 861B, and 861C is provided with a reference sign 862A, 862B, and 862C, respectively, by way of example.

The pixel electrode 861A has a shape line-symmetric with respect to a virtual line that passes through the midpoint of the shaft and is perpendicular to the shaft. Specifically, the teeth of the pixel electrode 861A on one side are disposed in a shape like a letter M narrowed at the center; the teeth 862A become gradually longer from the one disposed at the midpoint of the shaft to the ones disposed at its ends. The teeth of the pixel electrode 861A on the other side are disposed in a shape like a wedge; the teeth 862A become gradually shorter from the one disposed at the midpoint of the shaft to the ones disposed at its ends. The shape of the teeth on one side and the shape of the teeth on the other side are complementary to fit each other. In the example in FIG. 18, the pixel electrode 861A has sixteen teeth 862A on either side. The pixel electrodes 861B and 861C have the identical shapes to the pixel electrode 861A.

The configuration example in FIG. 18 has wide overlap regions 761 and 763 and a narrow exclusive region 762, like the configuration example in FIG. 17. For this reason, more natural display is attained by smoothing the brightness. The areas of the two pixel electrodes in the overlap regions 761 and 763 are equal. Specifically, in the overlap region 761, the total area of the teeth of the pixel electrode 861A is equal to the total area of the teeth of the pixel electrode 861B. In similar, in the overlap region 763, the total area of the teeth of the pixel electrode 861C is equal to the total area of the teeth of the pixel electrode 861B. The pixel electrodes having the shape as illustrated in FIG. 18 are applicable to the pixel electrode layout illustrated in FIG. 4A.

The foregoing configuration examples are for a horizontal electric field control type of liquid crystal panel. However, the features of this disclosure are applicable to a TN type or a VA type of liquid crystal panel. The pixel electrodes are fabricated in a layout such that pixel electrodes adjacent to each other partially overlap each other like the foregoing examples. The gate lines and data lines can be fabricated in straight lines as described with reference to the drawings or in bending lines.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A light source device for a display device, the light source device comprising:
   a planar light source; and
   a monochrome liquid crystal panel,
   wherein the monochrome liquid crystal panel includes a plurality of pixel electrodes,
   wherein pixel electrodes adjacent to each other in the plurality of pixel electrodes partially overlap each other within one pixel, and
   wherein the monochrome liquid crystal panel includes an exclusive region including a part of one of the plurality of pixel electrodes but not including the other pixel electrodes and an overlap region including parts of pixel electrodes adjacent to each other.

2. The light source device according to claim 1,
   wherein the monochrome liquid crystal panel includes a plurality of pixel electrode lines each composed of pixel electrodes disposed along a first axis,
   wherein the plurality of pixel electrode lines are disposed along a second axis perpendicular to the first axis, and
   wherein exclusive regions and overlap regions are disposed alternately in each of the plurality of pixel electrode lines.

3. The light source device according to claim 2, further comprising:
   a plurality of gate lines disposed to extend along the first axis and be distant from one another along the second axis.

4. The light source device according to claim 2, further comprising:
   a plurality of data lines disposed to extend along the first axis and be distant from one another along the second axis.

5. The light source device according to claim 1,
   wherein the pixel electrodes adjacent to each other are a first pixel electrode and a second pixel electrode,
   wherein each of the first pixel electrode and the second pixel electrode includes a shaft and rows of teeth on both sides of the shaft, and
   wherein one of the rows of teeth of the first pixel electrode and one of the rows of teeth of the second pixel electrode partially overlap each other.

6. The light source device according to claim 5, wherein teeth of the first pixel electrode and teeth of the second pixel electrode are disposed alternately in the overlap region.

7. The light source device according to claim 5, wherein first groups composed of a plurality of consecutive teeth of the first pixel electrode and second groups composed of a plurality of consecutive teeth of the second pixel electrode are disposed alternately in the overlap region.

8. The light source device according to claim 1, wherein each of the plurality of pixel electrodes partially overlaps two pixel electrodes adjacent to the pixel electrode on one side and partially overlaps two other pixel electrodes adjacent to the pixel electrode on the other side.

9. The light source device according to claim 8,
   wherein, in the exclusive region, the pixel electrode generates an electric field to be applied to liquid crystal with a common electrode provided on a different layer of the same substrate on which the pixel electrode is provided, and
   wherein, in the overlap region, the pixel electrode generates an electric field to be applied to liquid crystal with the adjacent pixel electrode.

10. A liquid crystal display device comprising:
    a color liquid crystal panel;
    a monochrome liquid crystal panel; and
    a planar light source,
    wherein the color liquid crystal panel, the monochrome liquid crystal panel, and the planar light source are stacked,
    wherein the monochrome liquid crystal panel includes a plurality of pixel electrodes,
    wherein pixel electrodes adjacent to each other in the plurality of pixel electrodes partially overlap each other within a pixel, and
    wherein the monochrome liquid crystal panel includes an exclusive region including a part of one of the plurality of pixel electrodes but not including the other pixel electrodes and an overlap region including parts of pixel electrodes adjacent to each other.

* * * * *